United States Patent [19]
Susa et al.

[11] Patent Number: 5,269,367
[45] Date of Patent: Dec. 14, 1993

[54] MOUNTING APPARATUS FOR CONDENSER

[75] Inventors: Sumio Susa, Anjo; Toshio Morikawa, Haguri; Atsushi Katoh, Nagoya; Akihiro Maeda, Kariya; Tatsuo Sugimoto, Kariya; Kazutaka Suzuki, Kariya; Akihito Tanaka, Toyohashi, all of Japan

[73] Assignee: Nippondenso Co., Ltd., Kariya, Japan

[21] Appl. No.: 912,235

[22] Filed: Jul. 10, 1992

[30] Foreign Application Priority Data

Jul. 12, 1991 [JP] Japan .................. 3-172310
Mar. 6, 1992 [JP] Japan .................. 4-049391

[51] Int. Cl.⁵ .............................. F24H 9/06
[52] U.S. Cl. ............................ 165/41; 165/67; 165/140; 180/68.4
[58] Field of Search ............ 165/41, 67, 140; 180/68.4, 68.1

[56] References Cited

U.S. PATENT DOCUMENTS

| | | | |
|---|---|---|---|
| 3,604,675 | 9/1971 | Mitchell et al. | 248/22 |
| 3,795,274 | 3/1974 | Fieni | 165/67 X |
| 4,306,615 | 12/1981 | Bolton et al. | 165/67 |
| 4,465,124 | 8/1984 | Jacquet et al. | 165/67 |
| 4,531,574 | 7/1985 | Hoch | 165/41 X |
| 4,538,697 | 9/1985 | Muroi et al. | 180/68.4 |
| 4,744,411 | 5/1988 | Lohmann | 165/41 |
| 4,821,828 | 4/1989 | Schwerzler et al. | 180/68.4 |
| 4,997,033 | 5/1991 | Ghiani et al. | 165/140 |

FOREIGN PATENT DOCUMENTS

| | | |
|---|---|---|
| 56-24280 | 6/1981 | Japan . |
| 59-32886 | 2/1984 | Japan . |
| 63-16925 | 2/1988 | Japan . |
| 3-13209 | 2/1991 | Japan . |

Primary Examiner—John Rivell
Attorney, Agent, or Firm—Cushman, Darby & Cushman

[57] ABSTRACT

The condenser is mounted in front of radiator by means of a mounting shroud, which includes a tubular portion for covering over an outer periphery of the condenser, a pair of vertical mounting walls provided on an inner periphery of the tubular portion, and a pair of mounting leg portions formed on an outer periphery of the tubular portion. The vertical mounting walls are securely fastened to upper and lower brackets of the condenser in a condition wherein the former contact with the latter, and the lower mounting leg portions are fitted in engaging recesses of a lower tank of the radiator while the upper mounting leg portions are securely fastened to an upper tank of the radiator. The tubular portion of the mounting shroud serves also as a wind introducing duct which prevents heated air having passed the radiator from coming around to the front of the condenser again.

18 Claims, 33 Drawing Sheets

MOUNTING APPARATUS FOR CONDENSER

BACKGROUND OF THE INVENTION

1. Field of the Invention

This invention relates to a mounting apparatus for a condenser for mounting a condenser, for example, of an automotive air conditioner on a body of an automobile or an automotive radiator.

2. Description of the Prior Art

Various mounting apparatus for a condenser of the type mentioned are already known, and one of such mounting apparatus is disclosed, for example, in Japanese Utility Model Laid-Open Publication No. 59-32886. According to the mounting apparatus, a mounting piece is coupled to a side frame on which a bent portion of a tube of a condenser is held, and the mounting piece is secured at the other end thereof to a receiving portion of a body of an automobile.

Another conventional mounting apparatus is disclosed, for example, in Japanese Utility Model Laid-Open Publication No. 3-13209 wherein a mounting bracket is coupled at an end portion thereof by welding to a side frame on which a bent portion of a tube of a condenser is held and the mounting bracket is fastened at the other end portion thereof to a receiving portion of an automotive radiator.

With the conventional mounting apparatus, however, an end portion of a mounting bracket must be coupled to a side frame by welding or the like. This makes a cause of increase in number of working steps in mounting a condenser onto a receiving portion of a body of an automobile or onto a receiving portion of a radiator.

SUMMARY OF THE INVENTION

It is an object of the present invention to provide a mounting apparatus for a condenser which minimizes the number of working steps in mounting a condenser onto a receiving portion.

In order to attain the object, according to the present invention, there is provided a mounting apparatus for a condenser for mounting on a receiving member a condenser which includes a heat exchanging section for converting gaseous coolant into liquid coolant by heat exchange and a bracket secured to a side portion of the head exchanging section, the mounting apparatus comprising a tubular element for covering over an outer periphery of the condenser, a vertical mounting wall element disposed on and secured to an inner periphery of the tubular element so as to be held in contact with the bracket, and a mounting leg element disposed on an outer periphery of the tubular element for being secured to the receiving member.

The vertical mounting wall element of the mounting apparatus and the bracket of the condenser are secured to each other in a condition wherein they contact with each other, and the mounting leg element of the mounting apparatus and the receiving member are secured to each other. The condenser is thus mounted on the receiving member by such simple means without using such means as welding. Consequently, reduction in number of working steps and reduction in cost can be achieved. Further, since the tubular element of the mounting apparatus covers over the outer periphery of the condenser, it can be prevented that air heated when it passes the condenser comes around to the front of the condenser again.

The above and other objects, features and advantages of the present invention will become apparent from the following description and the appended claims, taken in conjunction with the accompanying drawings in which like parts or elements are denoted by like reference characters.

BRIEF DESCRIPTION OF THE PREFERRED EMBODIMENTS

Figure 1:
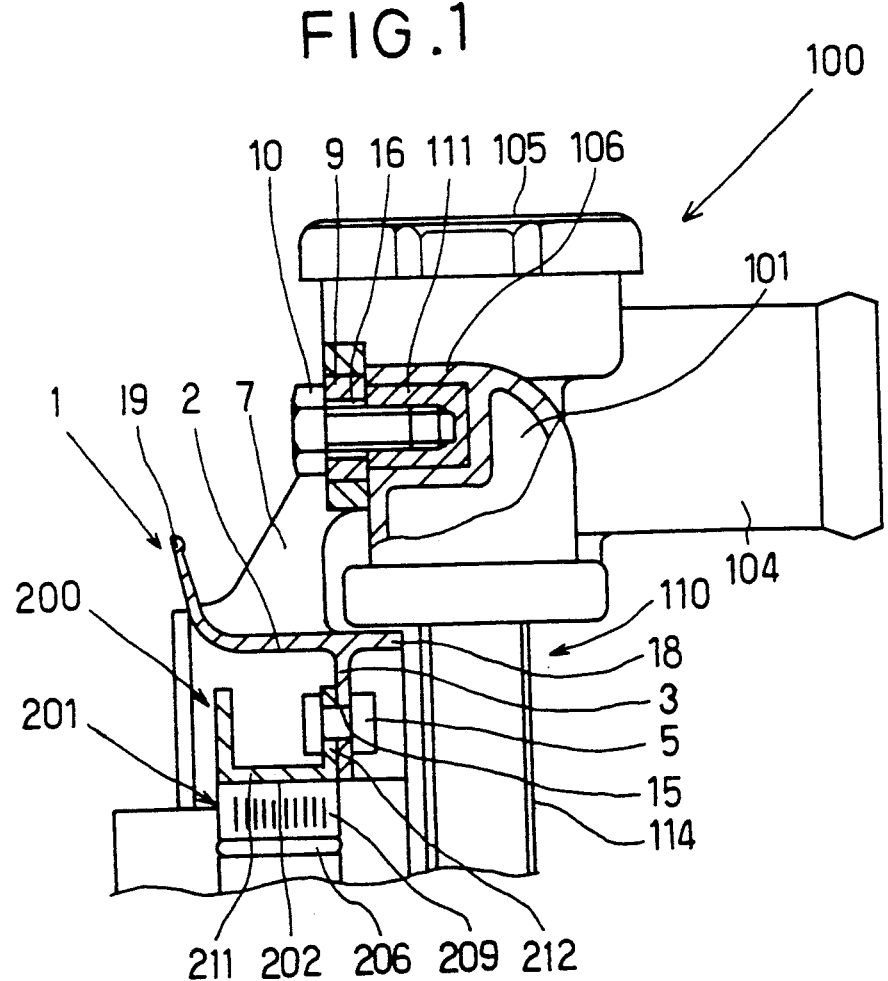
FIG. 1 is a sectional view of a mounting apparatus for a condenser showing a first preferred embodiment of the present invention.
Figure 2:
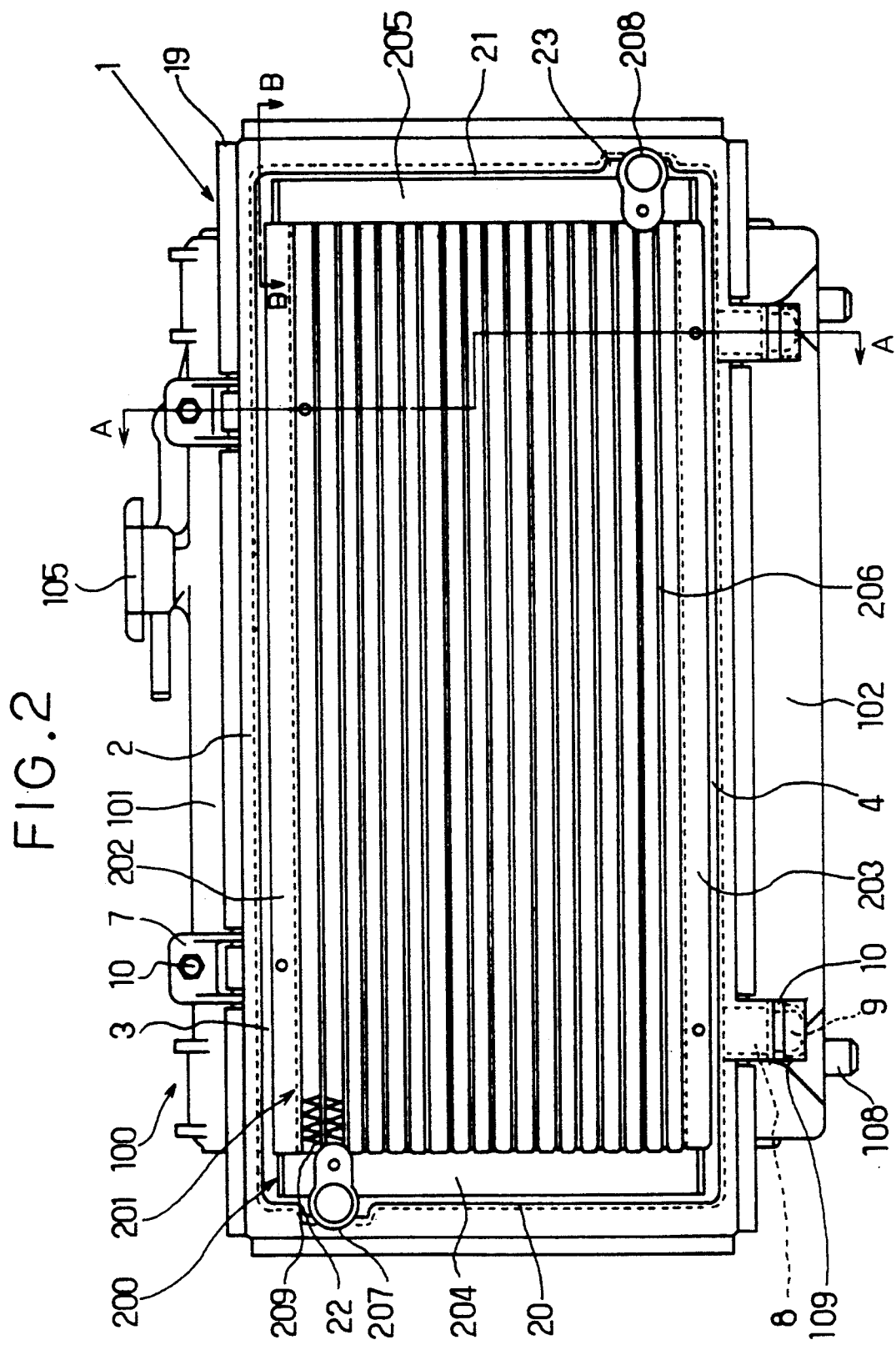
FIG. 2 is a front elevational view of the mounting apparatus of FIG. 1.
Figure 3:
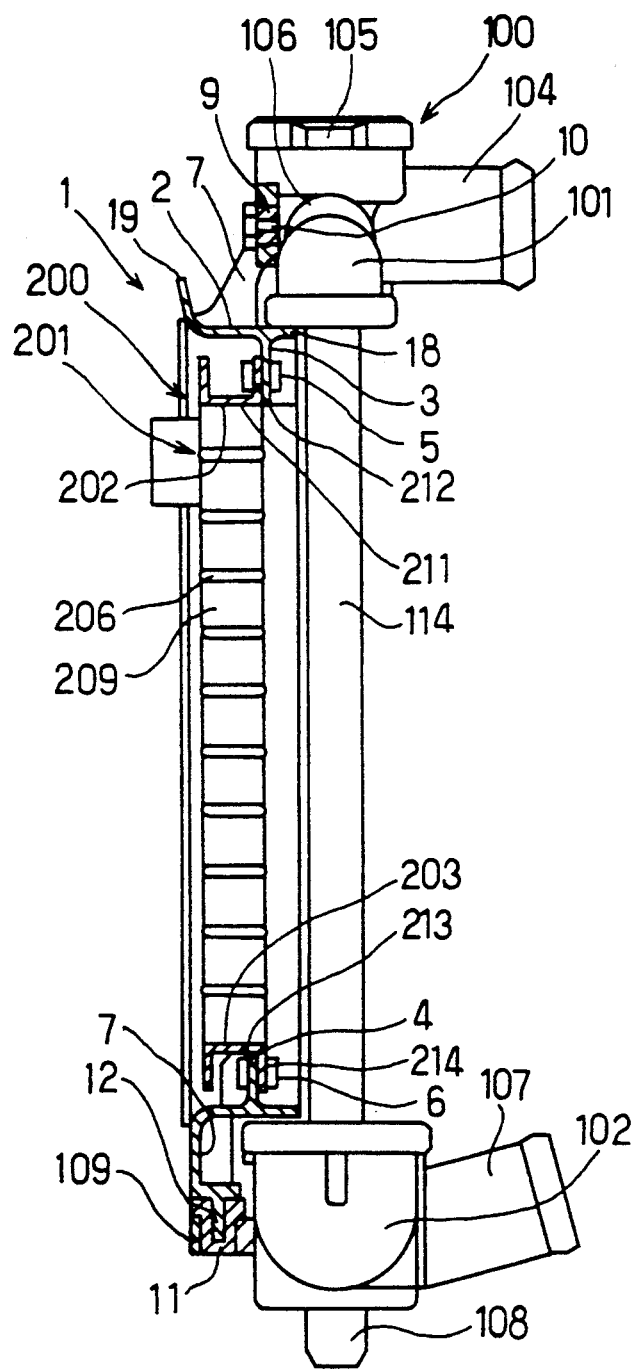
FIG. 3 is a sectional view taken along line A—A of FIG. 2.
Figure 4:
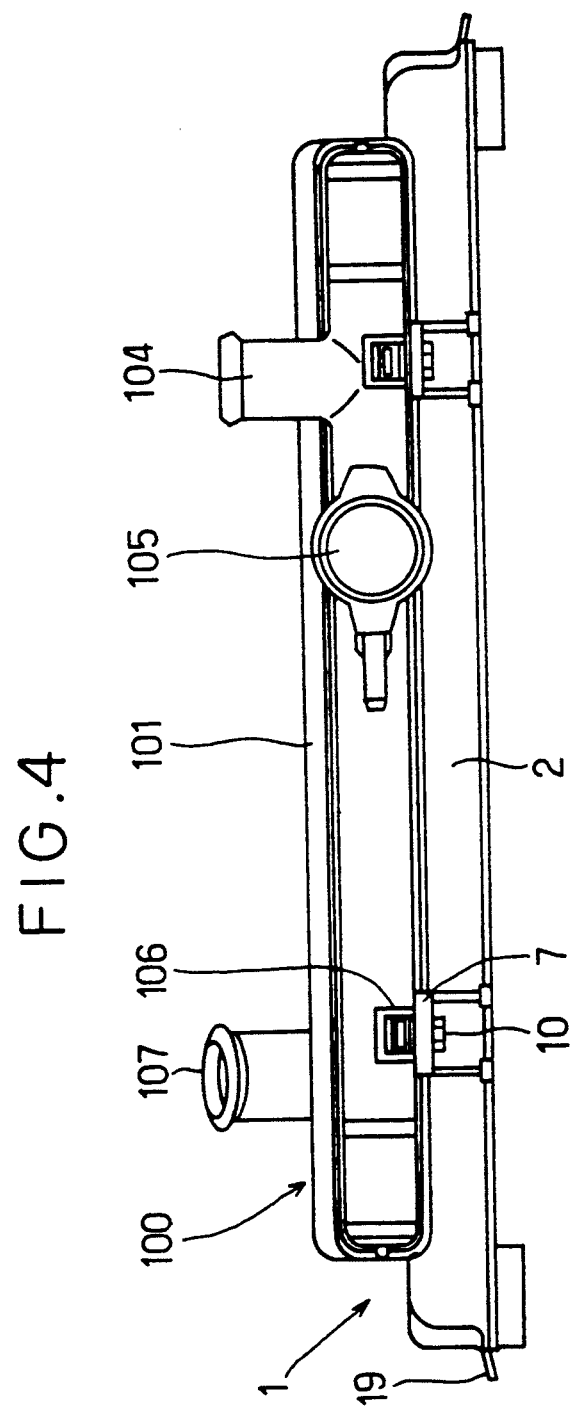
FIG. 4 is a top plan view of the mounting apparatus of FIG. 1.
Figure 5:
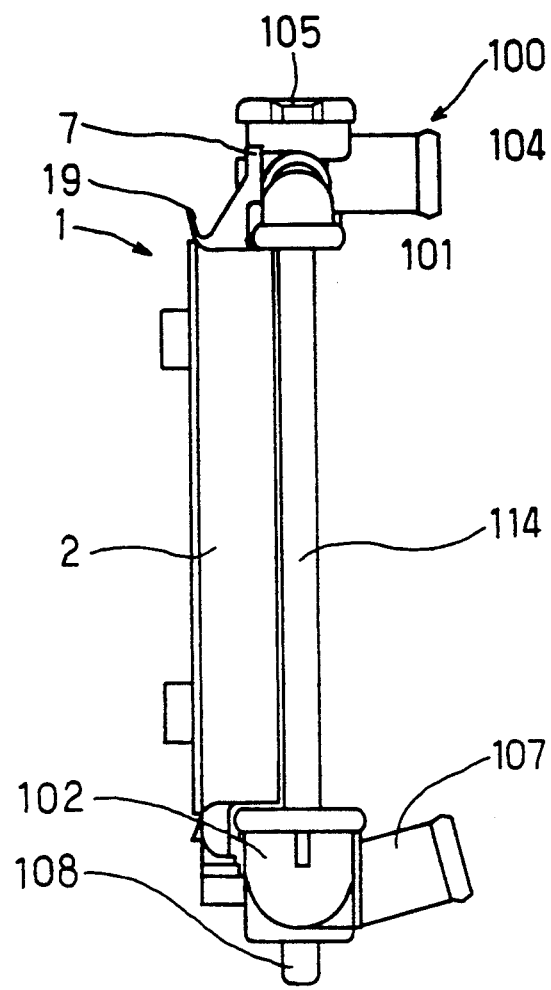
FIG. 5 is a side elevational view of the mounting apparatus of FIG. 1.

A mounting apparatus for a condenser according to a first preferred embodiment of the present invention is shown in FIGS. 1 to 12. FIGS. 1 to 6, shown a structure wherein a condenser and a radiator are integrated with each other.

An automotive radiator 100 has conventionally known structure and generally has a substantially rectangular profile. The automotive radiator 100 includes an upper tank 101, a lower tank 102, and a plurality of tubes 103 (shown in FIG. 6) for communicating the upper and lower tanks 101 and 102 with each other. An entrance pipe 104 for introducing cooling water from an engine (not shown) of the automobile into the upper tank 101 is connected to the upper tank 101, and a cap 105 is fitted on the entrance pipe 104. The cap 105 is opened when cooling water is to be supplemented into the upper pipe 101 through the entrance pipe 104. A pair of connecting portions 106 serving as receiving portions to which upper portions of a mounting shroud 1 are to be fixed are formed on the upper tank 101. An insert nut 111 is fitted in each of the connecting portions 106 of the upper tank 101.

An exit pipe 107 through which cooling water in the lower tank 102 flows toward the engine side is connected to the lower tank 102, and a pair of engaging projections 108 for mounting the radiator 100 in the engine room of the automobile are formed on the lower tank 102. A pair of engaging recesses 109 serving as receiving portions for fixing lower portions of the mounting shroud 1 thereto are formed on the lower tank 102.

Figure 6:
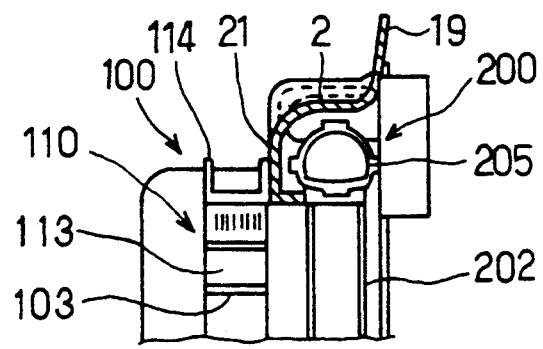
FIG. 6 is a sectional view taken along line B—B of FIG. 2.
Figure 7:
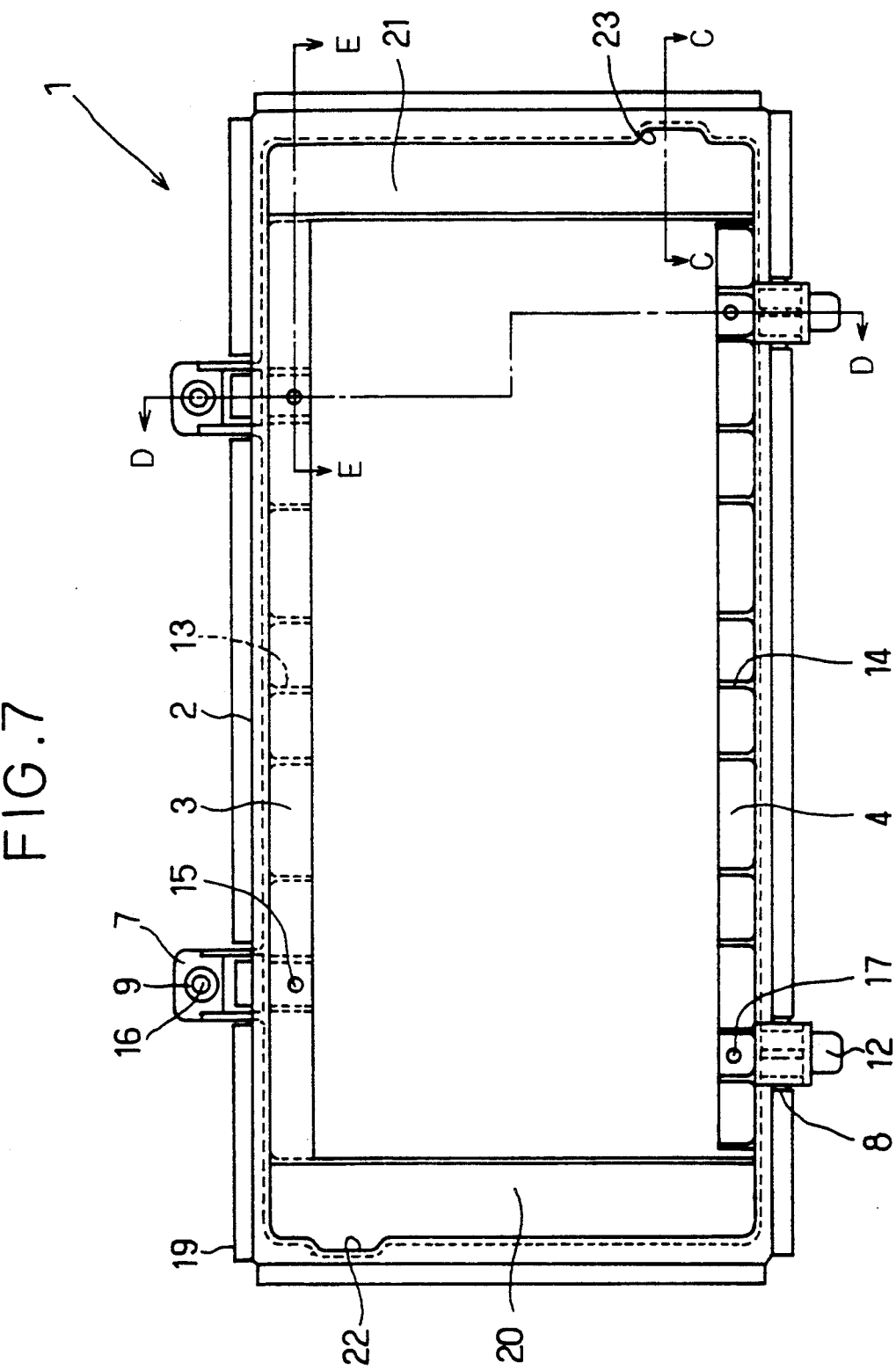
FIG. 7 is a front elevational view showing a mounting shroud of the mounting apparatus of FIG. 1.
Figure 8:
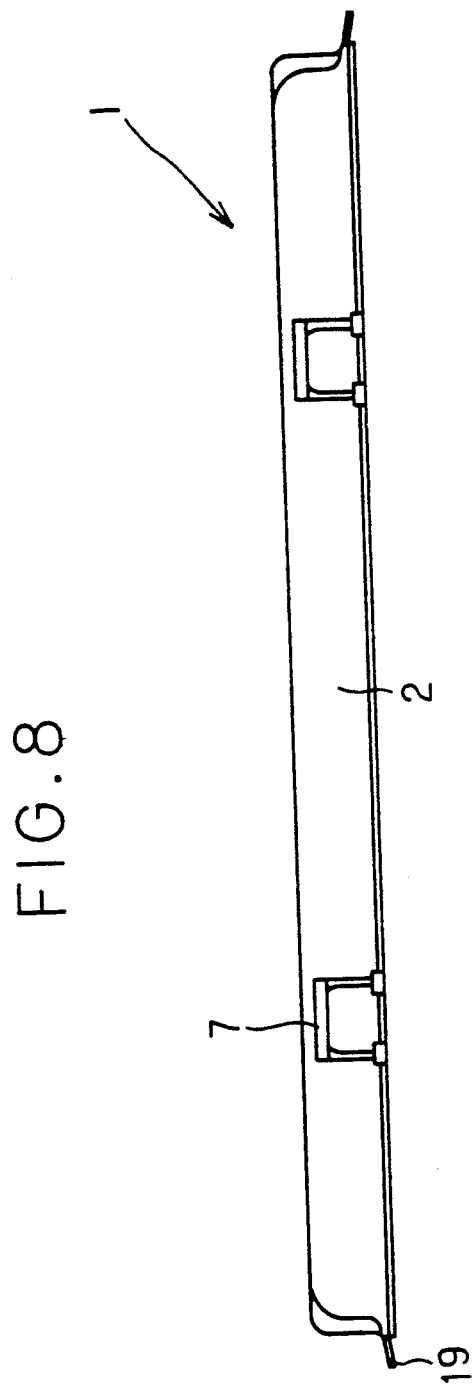
FIG. 8 is a top plan view of the mounting shroud of FIG. 7.
Figure 9:
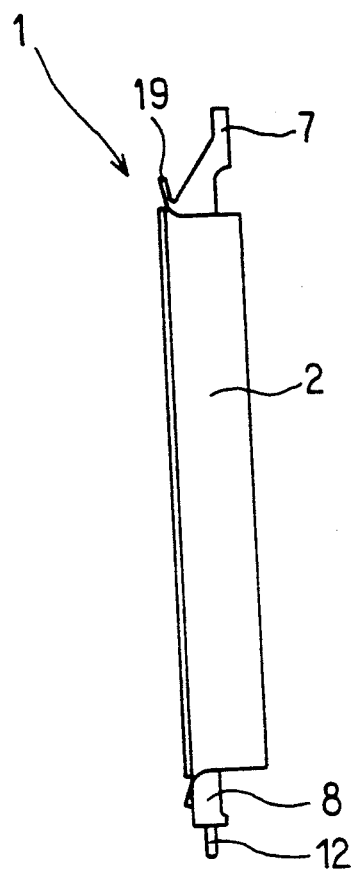
FIG. 9 is a side elevational view of the mounting shroud of FIG. 7.
Figure 10:
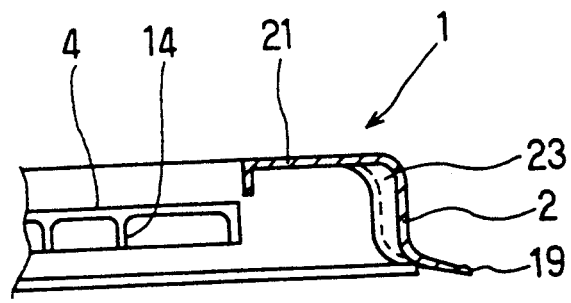
in FIG. 10 is a sectional view taken along line C—C of FIG. 7.
Figure 11:
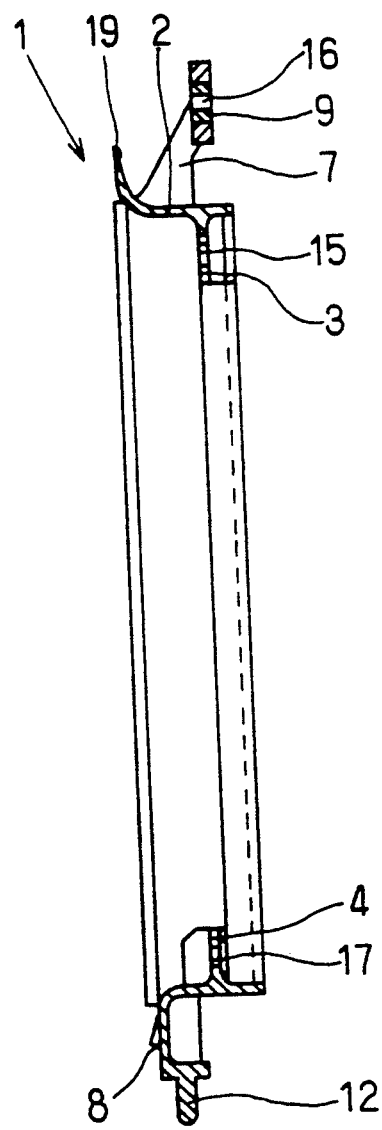
FIG. 11 is a sectional view taken along line D—D of FIG. 7.
Figure 12:
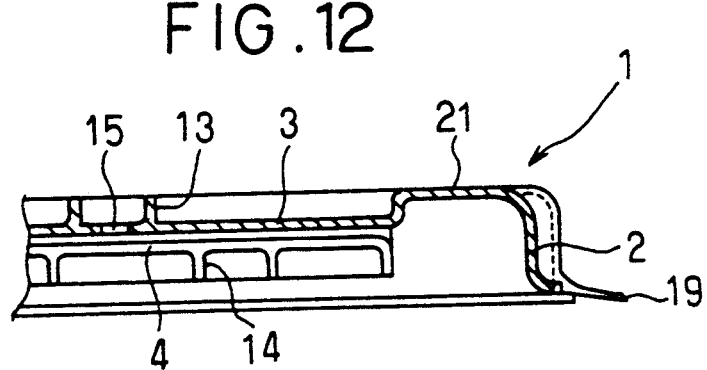
FIG. 12 is a sectional view taken along line E—E of FIG. 7.

The tubes 103 and corrugate fins 113 which are thermally coupled to each other side by side constitute a heat exchanging section 110 as shown in FIG. 6. A channel-shaped side frame 114 for fixing the heat exchanging section 110 is thermally coupled to each of those two of the corrugate fins 1.13 on the opposite left and right side portions of the heat exchanging section 110, that is, two outermost ones of the corrugate fins 113.

The components of the radiator 100 described above are each formed from an aluminum alloy or steel plate or the like and coupled to each other by suitable means such as brazing.

A condenser 200 of an automotive air conditioner is of the so-called multi-flow type and generally has a substantially rectangular profile. The condenser 200 includes a heat exchanging section 201 for causing gaseous coolant and cooling winds flowing into the same to exchange heat to convert the gaseous coolant into liquid coolant, an upper bracket 202 secured to an upper end portion of the heat exchanger 201, and a lower bracket 203 secured to a lower end of the heat exchanger 201. An entrance header tank 204 for introducing gaseous coolant from a compressor (not shown) into the heat exchanging section 201 is connected to a left side end of the heat exchanging section 201 while an exit header tank 205 for discharging liquid coolant condensed into a liquefied condition to an expansion valve (not shown) side is connected to a right side end of the heat exchanging section 201. The heat exchanging section 201 includes a plurality of tubes 206 for communicating the entrance and exit header tanks 204 and 205 with each other. A pair of pipe joints 207 and 208 for the connection of coolant pipes (not shown) are disposed for the entrance and exit pipe joints 207 and 208. Corrugate fins 209 having a corrugated profile are thermally connected to each adjacent ones of the tubes 206.

The upper bracket 202 has a channel-shaped cross section and has a base plate portion 211 secured to an upper end of the heat exchanging section 201, that is, an upper end of the tubes 206, and a pair of side plate portions 212 expending upwardly from the opposite ends of the base plate portion 211 toward the mounting shroud 1. Meanwhile, the lower bracket 203 similarly has a base plate portion 213 secured to a lower end of the heat exchanging section 201, and a pair of side plate portions 214 extending downwardly from the opposite ends of the base plate portion 213.

The components of the condenser 200 described above are each made of an aluminum alloy and are coupled to each other by brazing.

The mounting shroud 1 is shown in detail in FIGS. 7 to 12. The mounting shroud 1 constitutes a mounting apparatus for a condenser according to the present invention. The mounting shroud 1 is a rectangular tubular frame member made of a resin material and has the condenser 200 positioned on the inside thereof. The mounting shroud 1 acts also as a wind introducing duct interconnecting the condenser 200 and the heat exchanging section 110 of the radiator 100. The mounting shroud 1 has a tubular portion 2 which makes a base portion of the mounting shroud 1. The tubular portion 2 of the mounting shroud 1 has a hollow portion which is a little greater than an outer profile of the condenser 200 in such a manner as to cover over an outer periphery of the condenser 200. A vertical mounting wall 3 is formed continuously on an inner face of an upper side portion of the tubular portion 2 of the mounting shroud 1 such that it is provided over the entire length of the upper side portion of the tubular portion 2. The vertical mounting wall 3 extends substantially in a perpendicular direction from the inner face of the upper side portion of the tubular portion 2 and contacts with one of the side plate portions 212 of the upper bracket 202. Another vertical mounting wall 4 similar to the vertical mounting wall 3 is provided uprightly on an inner face of a lower side portion of the tubular portion 2 such that it contacts with one of the side plate portions 214 of the lower bracket 203.

The vertical mounting walls 3 and 4 are located in an offset condition in the forward and backward direction by a distance equal to the thickness of the upper and lower brackets 202 and 203. Due to such offset locations, an outer face of the side plate portion 212 of the upper bracket 202 is securely fastened to a front face of the vertical mounting wall 3 by means of bolts 5 while an outer face of the side plate portion 214 of the lower bracket 203 is securely fastened to a rear face of the vertical mounting wall 4 of the tubular portion 2 by means of bolts 6.

A pair of mounting leg portions 7 are formed integrally and continuously on an outer periphery of the upper side portion of the tubular portion 2 of the mounting shroud 1. The mounting leg portions 7 extend substantially in a perpendicular direction from the outer periphery of the upper side portion of the tubular portion 2 such that they contact with the upper tank 101 of the radiator 100. Meanwhile, a pair of mounting leg portions 8 extend on an outer periphery of the lower side portion of the tubular portion 2 such that they contact with the lower tank 102 of the radiator 100. An insert ring 9 made of a metal is fitted at an end portion of each of the mounting leg portions 7. The end portion of each of the mounting leg portions 7 is securely fastened by means of a bolt 10 to a fastening portion 106 formed on the upper tank 101 of the radiator 100. An engaging projection 12 is formed integrally and continuously at an end of each of the mounting leg portions 8 and is fitted in an engaging recess 109 formed on the lower tank 102 of the radiator 100.

It is to be noted that a plurality of ribs 13 for reinforcing the vertical mounting wall 3 are formed on a face of the vertical mounting wall 3 on the rear side of the condenser 200, that is, a face of the vertical mounting wall 3 adjacent the radiator 100. Further, another plurality of ribs 14 for reinforcing the vertical mounting wall 4 are formed also on a face of the vertical mounting wall 4 on the front side of the condenser 200, that is, a face of the vertical mounting-wall 4 remote from the radiator 100.

A plurality of fitting holes 15 in which the bolts 5 are fitted are formed in the vertical mounting wall 3 while another plurality of fitting holes 16 in which the bolts 10 are fitted are formed in the mounting leg portions 7 such that the fitting holes 15 and 16 are disposed on vertical straight lines on the opposite sides of the tubular portion 2. A further plurality of fitting holes 17 in which the bolts 6 are fitted are formed in the vertical mounting wall 4 such that the fitting holes 17 and the mounting leg portions 8 are disposed on vertical straight lines on the opposite sides of the tubular portion 2.

An opposing portion 18 is formed at an opening end of the tubular portion 2 adjacent the radiator 100 such that it is opposed to an outer peripheral edge of the heat exchanging section 110 of the radiator 100 with a small gap left therebetween. An expanded mouth portion 19 is formed at the other opening end of the tubular portion 2 remote from the radiator 100 such that it extends integrally and continuously from the tubular portion 2. The expanded mouth portion 19 is formed such that the distance between opposing portions of an inner periphery thereof increases toward an end portion thereof and the thickness thereof is a little smaller than the other portion of the tubular portion 2 so that it may have a suitable flexibility. When the radiator 100 and the condenser 200 are mounted on a car body, the expanded mouth portion 19 of the tubular portion 2 is either pressed against or opposed in a somewhat spaced relationship to a partition wall (not shown) which may be a radiator support, a radiator upper support, a front cross member or the like in an engine room of the automobile. A pair of back walls 20 and 21 are formed integrally and continuously on the left and right sides of the tubular portion 2 such that they cover over rear faces of the entrance and exit header tanks 204 and 205, respectively, of the condenser 200 which extends outwardly in the leftward and rightward directions from the heat exchanging section 110 of the radiator 100. Further, the tubular portion 2 has a pair of recesses 22 and 23 formed at portions thereof adjacent the pipe joints 207 and 208 such that they are recessed in the leftward and rightward directions from the remaining portion of the tubular portion 2 so as to bypass the pipe joints 207 and 208.

A procedure of mounting the condenser 100 onto the radiator 200 will be described subsequently with reference to FIGS. 1 to 12.

First, while the condenser 200 is held in a condition wherein it is inclined a little forwardly, one of the side plate portions 214 of the lower bracket 203 is engaged with the vertical mounting wall 4 of the mounting shroud 1. Then, one of the side plate portions 212 of the upper bracket 202 is contacted with the vertical mounting wall 3. Consequently, the side plate portion 212 and the vertical mounting wall 3 are contacted with each other while the side plate portion 214 and the vertical mounting wall 4 are contacted with each other.

Then, the front face of the vertical mounting wall 3 and the outer face of the side plate portion 212 are fastened to each other by means of the bolts 5 inserted into the insertion holes 15 formed in the vertical mounting wall 3. Similarly, the rear face of the vertical mounting wall 4 and the inner face of the side plate portion 214 are fastened to each other by means of the bolts 6 inserted into the insertion holes 17 formed in the vertical mounting wall 4 to mount the condenser 200 onto the mounting shroud 1.

Subsequently, the engaging projections 12 formed on the two mounting leg portions 8 of the mounting shroud 1 in which the condenser 200 is mounted are fitted into the engaging recesses 109 formed in the lower tank 102 of the radiator 100. Further, the mounting leg portions 7 are contacted with the connecting portions 106 formed on the upper tank 101 of the radiator 100, and then the rear faces of the mounting leg portions 7 and the connecting portions 106 are fastened to each other by means of the bolts 10 inserted into the insertion holes 16 formed in the mounting leg portions 7 to mount the mounting shroud 1 onto the radiator 100. Accordingly, the mounting operation of the radiator 100 onto the condenser 200 is simple owing to the mounting shroud 1, and the mounting shroud 1 which also has a function of a wind introducing duct can be mounted onto the radiator 100 simultaneously with the condenser 200.

The structure (module) wherein the radiator 200 and the radiator 100 are integrated with each other in such a mounting procedure as described above is subsequently secured by a conventionally known method in front of the engine room of the automobile. It is to be noted that, in this instance, the mounting shroud 1 is secured in such a condition that the expanded mouth portion 19 formed on the tubular portion 2 thereof is either pressed against or spaced by a small distance from the partition wall which is formed from the radiator support, radiator upper support, front cross member or the like in the engine room of the automobile.

Action of the mounting shroud 1 will subsequently be described briefly with reference to FIGS. 1 to 12.

Air introduced into the engine room of the automobile by means of a cooling fan (not shown) or the like is guided by the tubular portion 2 of the mounting shroud 1 and passes through the heat exchanging section 210 of the condenser 200. In this instance, the air exchanges heat with gaseous coolant, which flows in the tubes 206 of the condenser 200, so that it is heated.

The air heated by the condenser 200 is all guided by the tubular portion 2 of the mounting shroud 1 and passes through the heat exchanging portion 110 of the radiator 100. Thereupon, the air exchanges heat with cooling water, which flows in the heat exchanging section 110, so that it is further heated. It is to be noted that the thus heated air having passed through the radiator 100 then tries to pass sidewardly of the radiator 100 and come around to the front side of the radiator 100 again, but the tubular portion 2 of the mounting shroud 1 prevents the heated air from coming around to the front side of the radiator 100. Further, the rear side of the radiator 100 and the front side of the condenser 200 are partitioned by the partition wall, which is composed of the radiator support, radiator upper support, front cross member or the like and the tubular portion 2 of the mounting shroud 1 so that it is prevented that the heated air having passed through the radiator 100 comes to the front side of the condenser 200 again.

Figure 13:
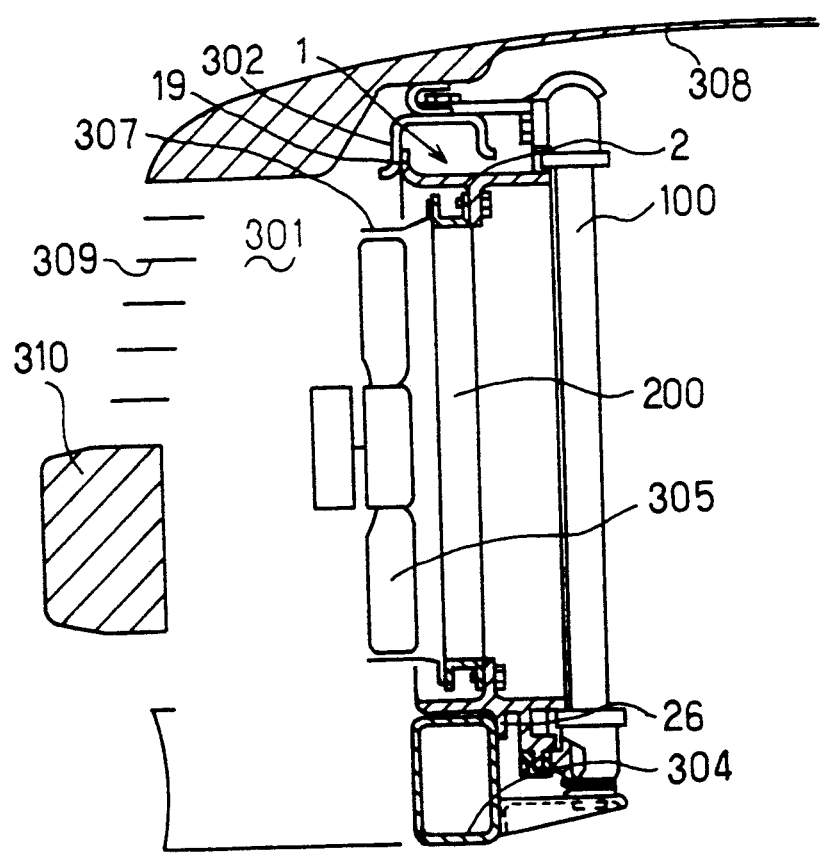
FIG. 13 is a schematic side elevational sectional view of a condenser mounted on a car body by another mounting apparatus showing a second preferred embodiment of the present invention.
Figure 14:
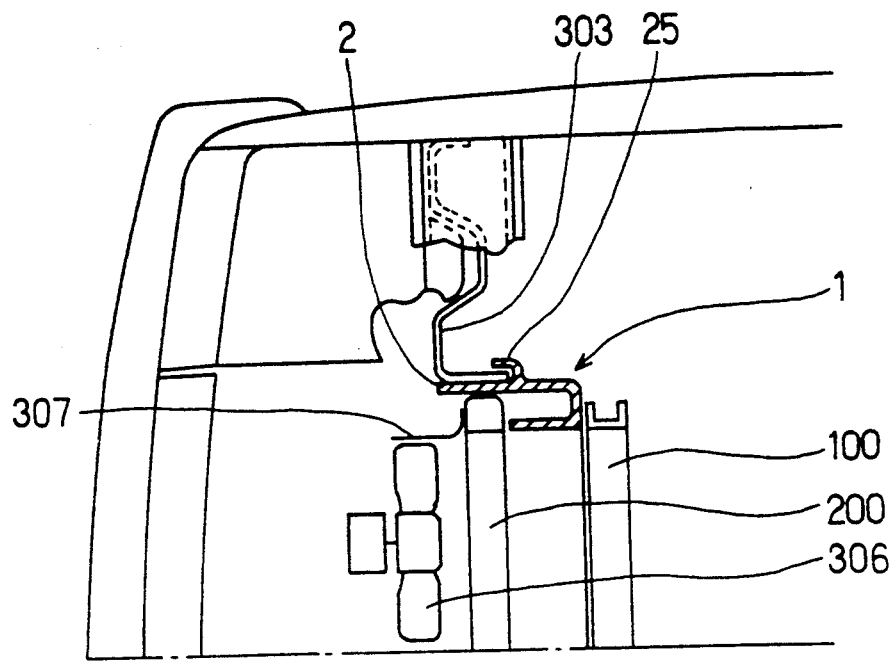
FIG. 14 is a schematic top plan view of the condenser mounted on the car body shown in FIG. 13.

FIGS. 13 and 14 show a mounting apparatus of or a radiator according to a second preferred embodiment of the present invention. The mounting apparatus includes a mounting shroud 1 which is mounted in an engine room 301 of an automobile together with a condenser 200 and a radiator 100.

The mounting shroud 1 has an expanded mouth portion 19 only at an upper side portion of a tubular portion 2 thereof, and the tubular portion 2 is elongated, at a lower side portion and left and right side portions thereof, in the direction away from the radiator 100. The expanded mouth portion 19 at the upper side portion of the tubular portion 2 is held in contact with a radiator upper support 302. An engaging portion 25 having an L-shaped cross section is formed integrally and continuously on each of outer faces of the left and right side portions of the tubular portion 2. Each of the engaging portions 25 is fitted in a radiator support 303.

A projected wall 26 is formed on an outer face of the lower side portion of the tubular portion 2 such that it extends substantially in a perpendicular direction from the tubular portion 2. The projected wall 26 is disposed in an opposing relationship to a front cross member 304 with a small gap left therebetween.

A pair of cooling fans 305 and 306 for sending cooling winds to the radiator 100 and the condenser 200 are disposed in front of the condenser 200. A fan shroud 307 for introducing cooling winds efficiently is disposed around the cooling fans 305 and 306. The automobile further includes a bonnet cover 308 which covers over the engine room 301, a front grill 309 for introducing a cooling wind into the engine room 301, and a bumper 310.

Figure 15:
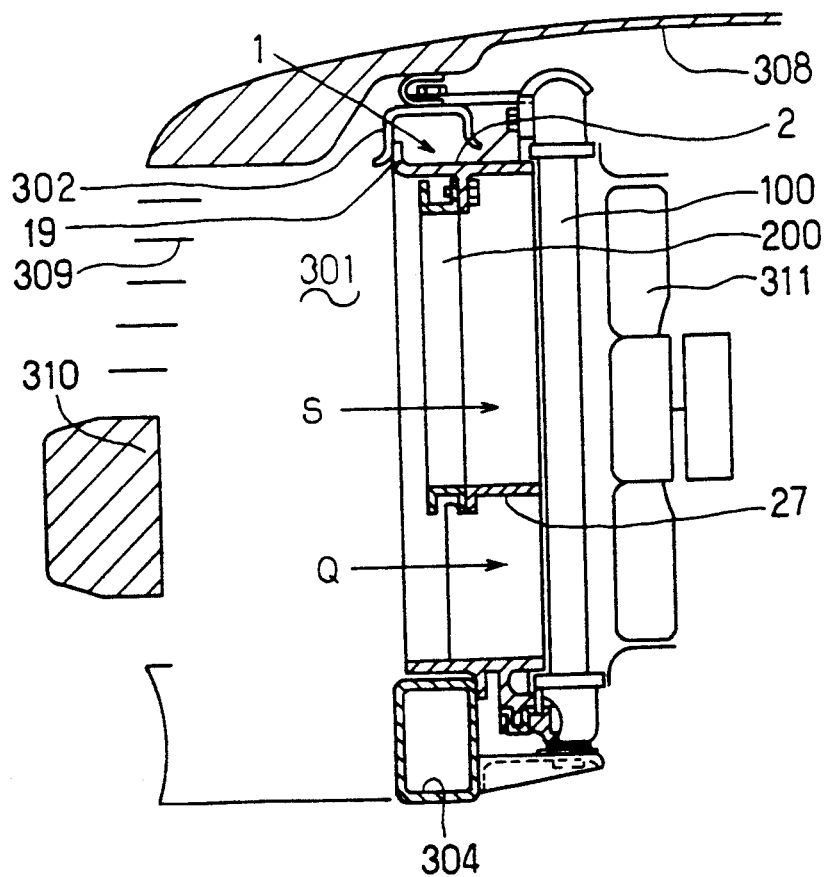
FIG. 15 is a schematic side elevational sectional view of a condenser mounted on a car body by a further mounting apparatus showing a third preferred embodiment of the present invention.

FIG. 15, shows a mounting apparatus for a radiator according to a third preferred embodiment of the present invention. In the mounting apparatus, the inside of a mounting shroud 1 is divided into two wind passageways S and Q in an upward and downward direction of an automobile by a partition plate 27. A condenser 200 is located in the wind passageway S while a cooling wind flowing in the wind passageway Q only passes through a radiator 100. A cooling fan 311 is disposed rearwardly of the radiator 100.

Figure 16:
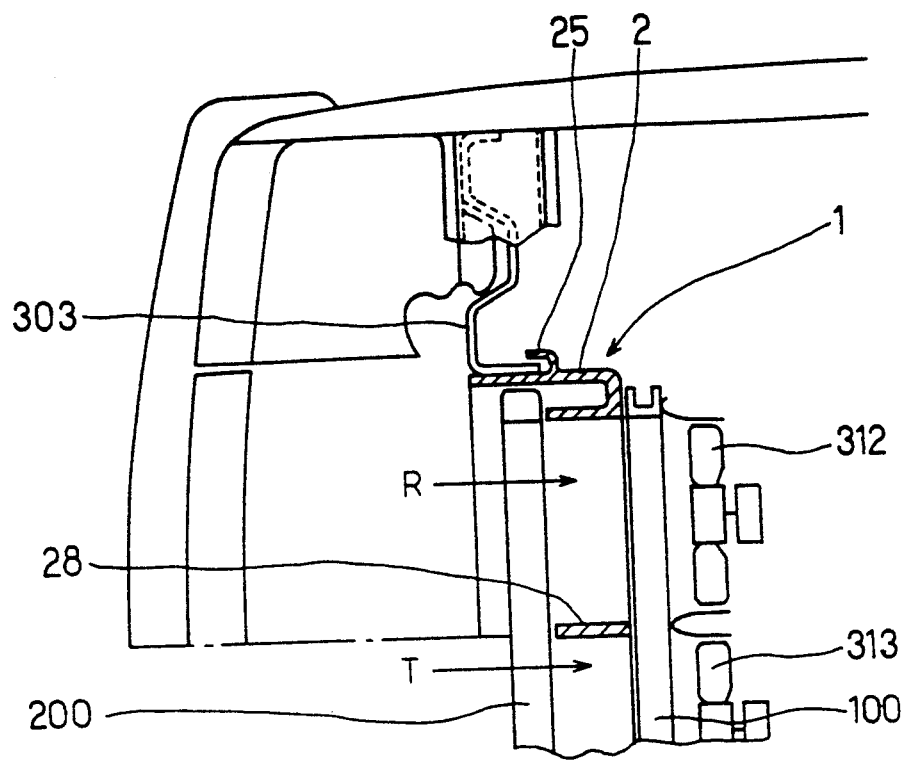
FIG. 16 is a schematic side elevational sectional view of a condenser mounted on a car body by a still further mounting apparatus showing a fourth preferred embodiment of the present invention.

FIG. 16 shows a mounting apparatus for a radiator according to a fourth preferred embodiment of the present invention. In the mounting apparatus, the inside of a mounting shroud 1 is divided into two wind passageways R and T in a leftward and rightward direction of an automobile by a partition plate 28. A pair of cooling fans 312 and 313 are disposed for the wind passageways R and T, respectively, rearwardly of a radiator 100.

Figure 17:
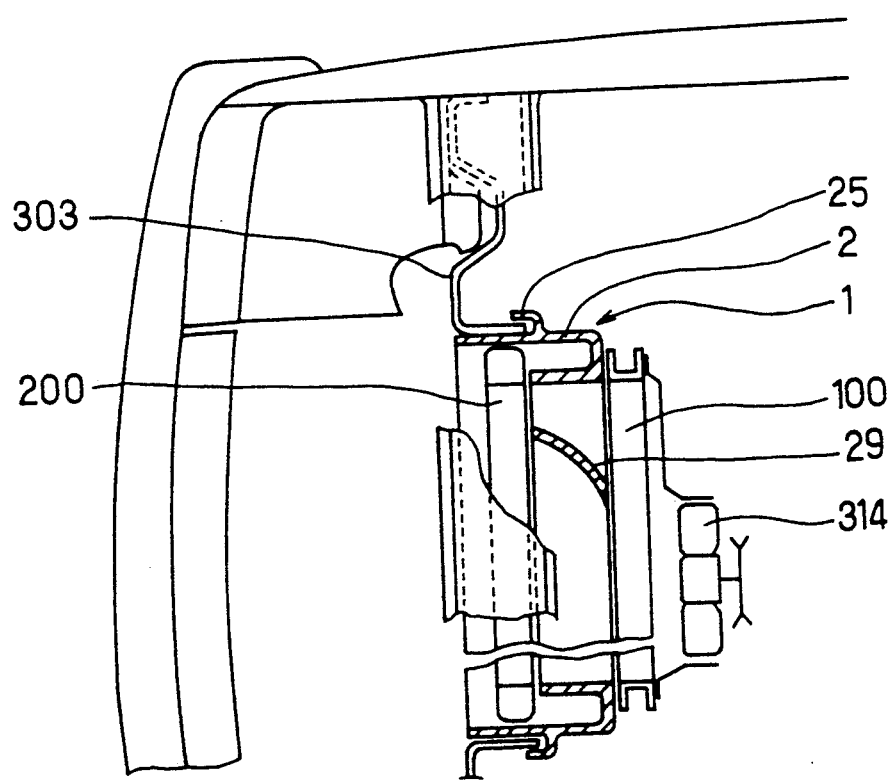
FIG. 17 is a schematic side elevational sectional view of a condenser mounted on a car body by a yet further mounting apparatus showing a fifth preferred embodiment of the present invention.

FIG. 17 shows a mounting apparatus for a radiator according to a fifth preferred embodiment of the present invention. In the mounting apparatus, the inside of a mounting shroud 1 is divided into two portions in an upward and downward direction of an automobile by a partition plate 29 having a curved profile. The partition plate 29 is curved such that the dividing ratio is great on the front side of the automobile and decreases toward the rear of the automobile. A cooling fan 314 is disposed at a position displaced from the center of the radiator 100 on a rear side face of the radiator 100. In case the partition plate 29 is not formed, the wind speed distribution on the front side of the condenser 200 is high since the cooling fan 314 is disposed at such a displaced location as described above. However, since the partition plate 29 is provided, the wind speed distribution can be made comparatively uniform.

Figure 18:
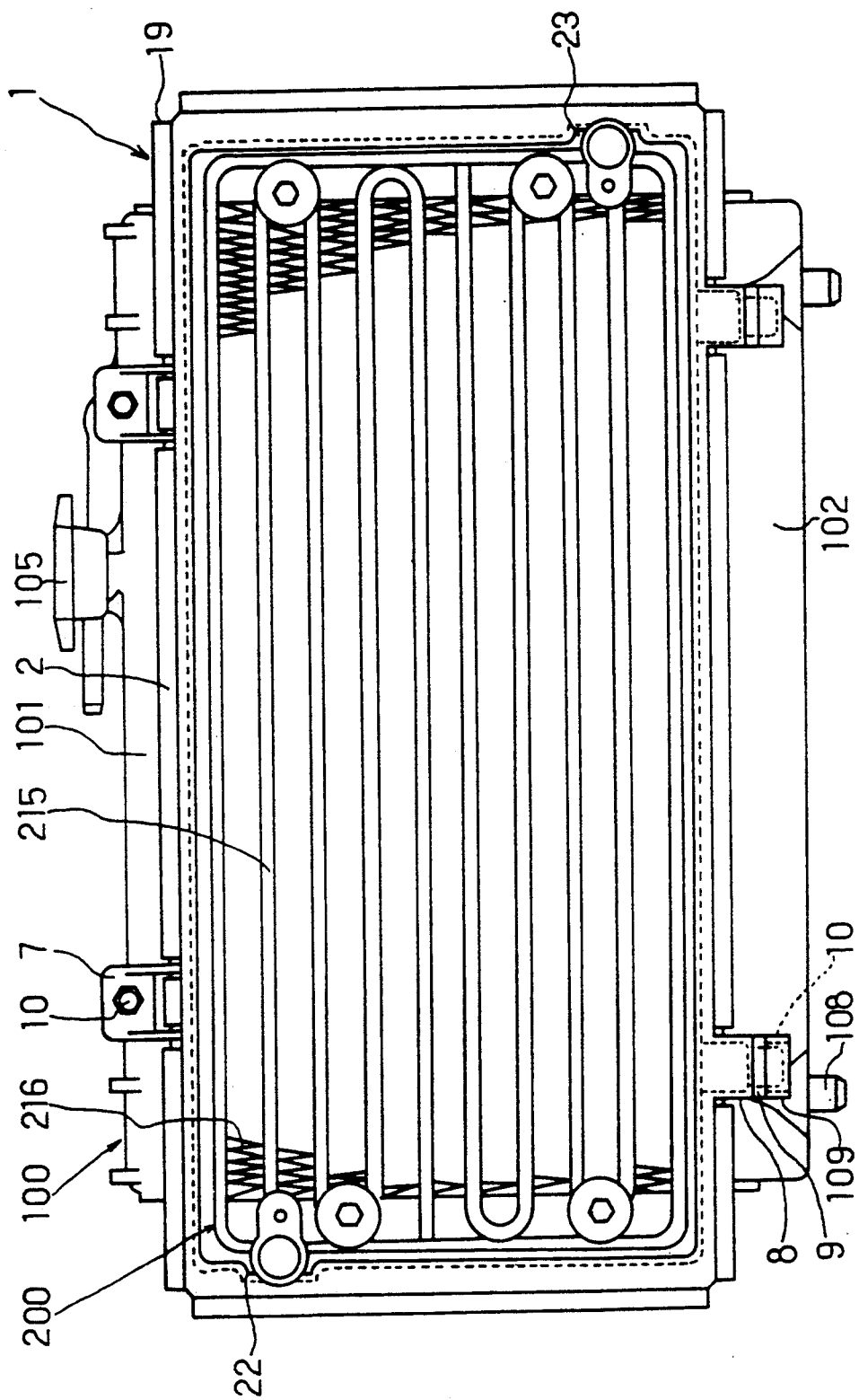
FIG. 18 is a front elevational view of a yet further mounting apparatus showing a sixth preferred embodiment of the present invention.

FIG. 18 shows a mounting apparatus for a radiator according to a sixth preferred embodiment of the present invention. In the present mounting apparatus, the mounting shroud 1 which is employed in the mounting apparatus of the first embodiment described hereinabove covers over an outer periphery of a condenser 200 of the so-called serpentine type in which tubes 215 are disposed in a serpentine pattern. Corrugate fins 216 curved in a corrugated shape are thermally coupled to and between each adjacent ones of the tubes 215. It is to be noted that a heat exchanging section 201 is constituted from the tubes 215 and the corrugate fins 216.

Figure 19:
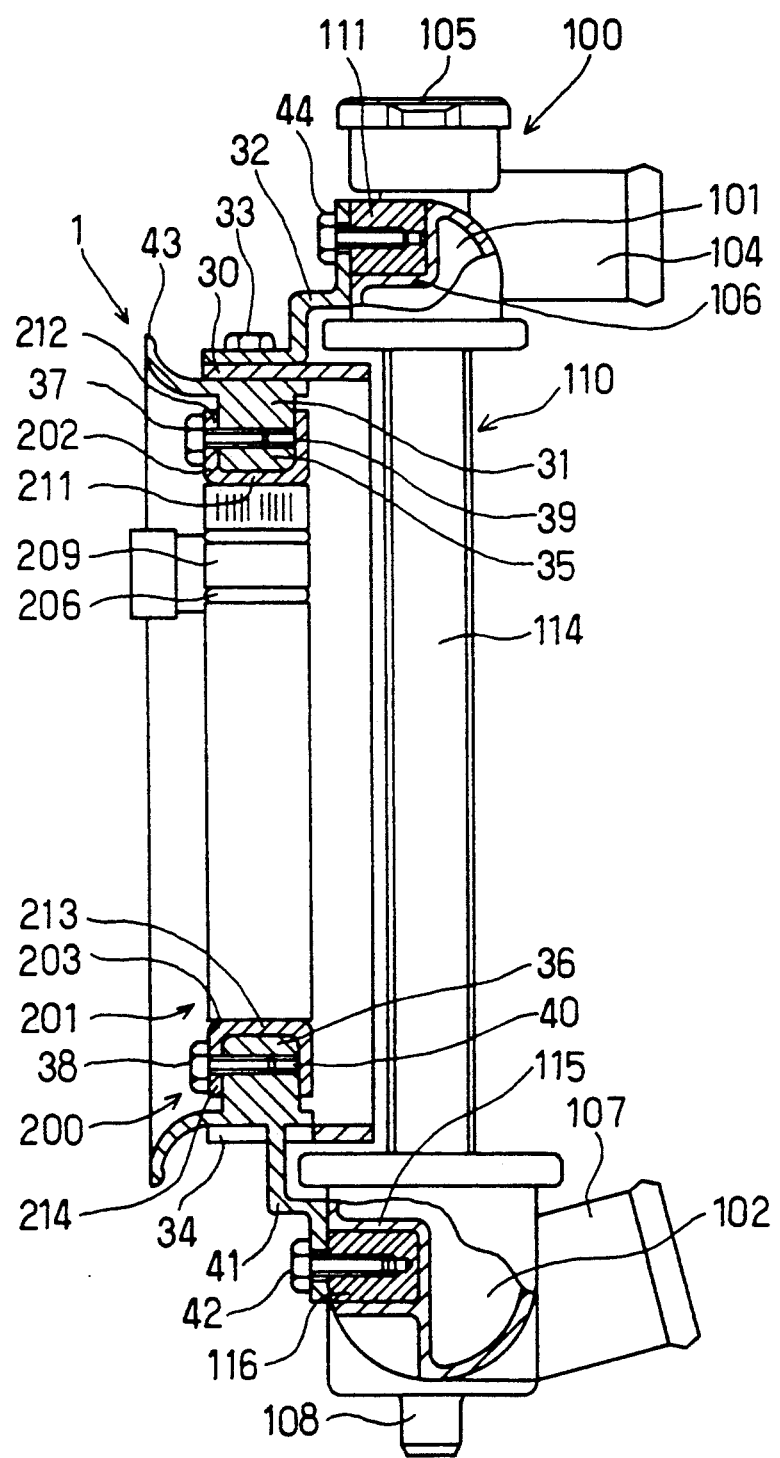
FIG. 19 is a sectional view of a yet further mounting apparatus showing a seventh preferred embodiment of the present invention.
Figure 20:
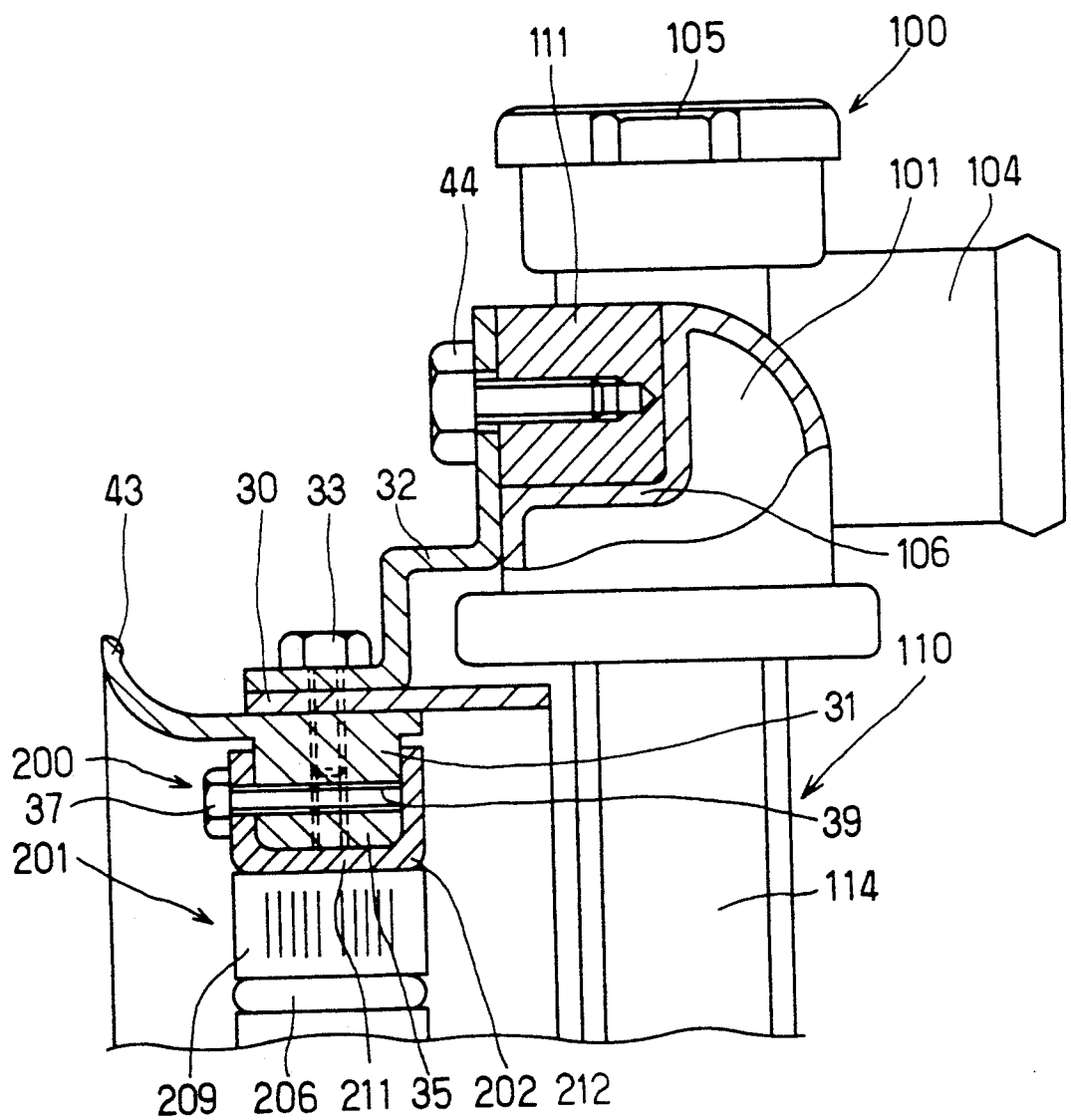
FIG. 20 is a partial enlarged sectional view of the mounting apparatus of FIG. 19.

FIGS. 19 and 20 show a mounting apparatus for a radiator according to a seventh preferred embodiment of the present invention. The mounting apparatus includes a mounting shroud 1 of the divided type constituted from a tubular portion 30, a vertical mounting wall 31 and a mounting leg portion 32. The mounting shroud 1 covers over an outer periphery of a condenser 200. The tubular portion 30 has an opening end portion adjacent the radiator 100 such that it is opposed to a heat exchanging section 110 of the radiator 100. The opposite end portion of the tubular portion 300 remote from the radiator 100 is disposed such that it is located around an upper bracket 202 and a lower bracket 203 of the condenser 200, and a pair of insertion holes (not shown) for bolts 33 are formed in each of upper and lower side portions of the tubular portion 30. A pair of recesses 34 are formed at the lower side portion of the tubular portion 30.

The vertical mounting wall 31 has a fitting portion 35 disposed for contacting in a face-to-face relationship with an inner periphery of the upper side portion of the tubular portion 30, and another fitting portion 36 disposed for contacting in a face-to-face relationship with an inner periphery of the lower side portion of the tubular portion 30. The fitting portion 35 is formed over the entire upper side portion of the tubular portion 30 and is fitted between a pair of side plate portions 212 of the upper bracket 202. The other fitting portion 36 is formed similarly over the entire lower side portion of the tubular portion 30 and is fitted between a pair of side plate portions 214 of the lower bracket 203. Pairs of threaded holes 39 and 40 for bolts 37 and 38 are formed in the fitting portions 35 and 36, respectively. A pair of mounting leg portions 41 extend from a lower face of the fitting portion 36 of the lower side portion of the tubular portion 2 and fit with the recesses 34. End portions of the mounting leg portions 41 are securely fastened by means of bolts 42 to the lower tank 102 of the radiator 100 in a condition wherein they are abutted with the lower tank 102.

An annular expanded mouth portion 43 extends from an outer periphery of the vertical mounting wall 31 away from the radiator 100. The upper and lower side portions of the vertical mounting wall 31 are connected integrally and continuously by the expanded mouth portion 43. The expanded mouth portion 43 of the vertical mounting wall 31 forms, together with the tubular portion 30, an air passageway sectioned between the heat exchanging section 110 of the radiator 100 and the condenser 200. An end portion of the mounting leg portion 32 is securely fastened by means of a bolt 33 in such a condition that it contacts with an outer face of the upper side portion of the tubular portion 30. The other end portion of the mounting leg portion 32 is securely fastened by means of a bolt 44 to the upper tank 101 of the radiator 100 in such a condition that it contacts with the upper tank 101.

A fastening portion 115 serving as a receiving portion for securely fastening the mounting leg portions 41 thereto is formed on the lower tank 102 of the radiator 100. An insert nut 116 is fitted in the connecting portions 115.

An exemplary procedure of mounting the condenser 100 onto the radiator 200 will be described subsequently with reference to FIGS. 19 and 20.

First, the fitting portion 35 of the upper side portion of the vertical mounting wall 31 is fitted between the two side plate portions 212 of the upper bracket 202, and the fitting portion 35 and the side plate portions 212 are fastened to each other by means of bolts 37. Similarly, the fitting portion 36 of the lower side portion of the vertical mounting wall 31 is fitted between the side plate portions 214 of the lower bracket 203, and the fitting portion 36 and the side plate portions 214 are fastened to each other by means of bolts 38.

Then, the tubular portion 30 is fitted onto outer faces of the upper and lower side portions of the vertical mounting wall 31, and an end portion of the mounting leg portion 32 is placed on the upper side portion of the tubular portion 30. In this condition, the vertical mounting wall 31, the tubular portion 30 and the mounting leg portion 32 are fastened to each other by means of bolts 33, thereby mounting the mounting shroud 1 onto the condenser 200.

Subsequently, an end portion of the mounting leg portion 41 of the mounting shroud 1 in which the condenser 200 is secured is pressed against the fastening portion 115 of the lower tank 102 of the radiator 100, and then the end portion of the mounting leg portion 41 and the lower tank 102 of the radiator 100 are fastened to each other by means of bolts 42. Similarly, the other end of the mounting leg portion 32 is pressed against the fastening portion 106 of the upper tank 101 of the radiator 100, and the other end portion of the mounting leg portion 32 and the upper tank 101 are fastened to each other by means of bolts 44, thereby mounting the mounting shroud 1 onto the radiator 100.

Thus, the condenser 200 is mounted onto the radiator 100 by such simple operations as described above by means of the mounting shroud 1 of the divided type.

It is to be noted here that, in the mounting apparatus of the first embodiment described above, since the tubular portion 2 of the mounting shroud 1 forms air passageways sectioned between the heat exchanging section 110 of the radiator 100 and the condenser 200, a very severe profile management is required for the opposing portion 18 of the tubular portion 2.

On the other hand, in the mounting apparatus of the seventh embodiment, since the vertical mounting wall 31 and the mounting leg portion 32 are formed separately from the tubular portion 30, it is possible for the opening end portion of the tubular portion 30 adjacent the radiator 100 to have a simple rectangular profile. Consequently, the requirement for the severe profile management of a profile of the opening end portion of the tubular portion 30 adjacent the radiator 100 is eliminated.

Further, since the fitting portions 35 and 36 of the vertical mounting wall 31 are fitted in the upper and lower brackets 202 and 203, respectively, the upper and lower brackets 202 and 203 are reinforced by them. Consequently, otherwise possible deformation of the upper and lower brackets 202 and 203 upon securely fastening can be prevented.

Furthermore, if only the shape and dimensions of any of the components of the mounting shroud 1 are changed, then other components can be made common between different models of automobiles having bodies having different profiles. Besides, even when the profile of the car body is same and the tubular portion 30 has a same profile, it is possible to change the profile of the mounting leg portion 32. Further, the dimension of the tubular member 30 in the forward and backward direction can be reduced at the expanded mouth portion 43 of the vertical mounting wall 31, the mounting leg portion 32 or the like. In addition, if the tubular portion 30 is made of a resin, then simplification and miniaturization of a resin mold for forming the tubular portion 30 can be achieved.

Figure 21:
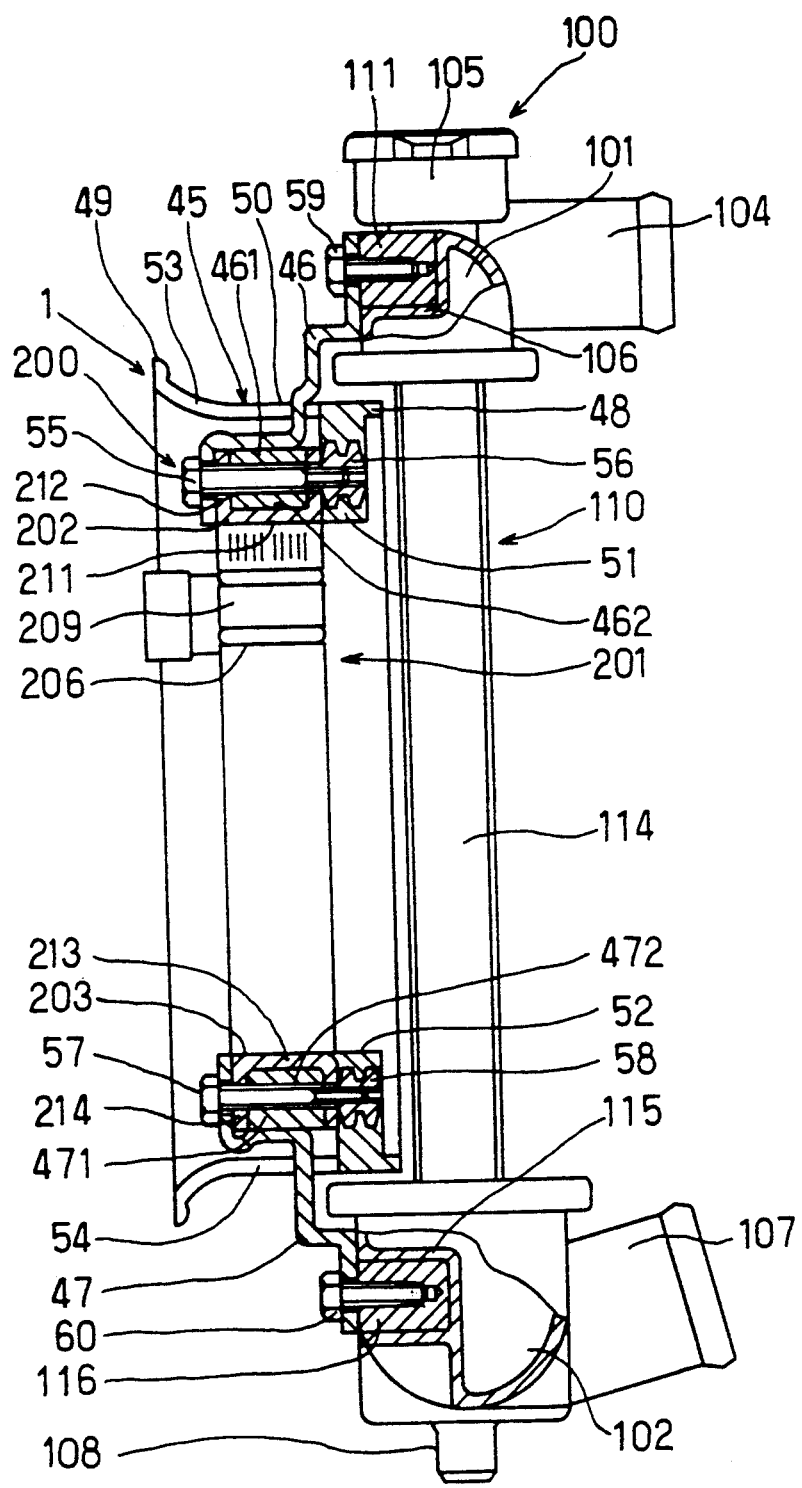
FIG. 21 is a sectional view of a yet further mounting apparatus showing an eighth preferred embodiment of the present invention.
Figure 22:
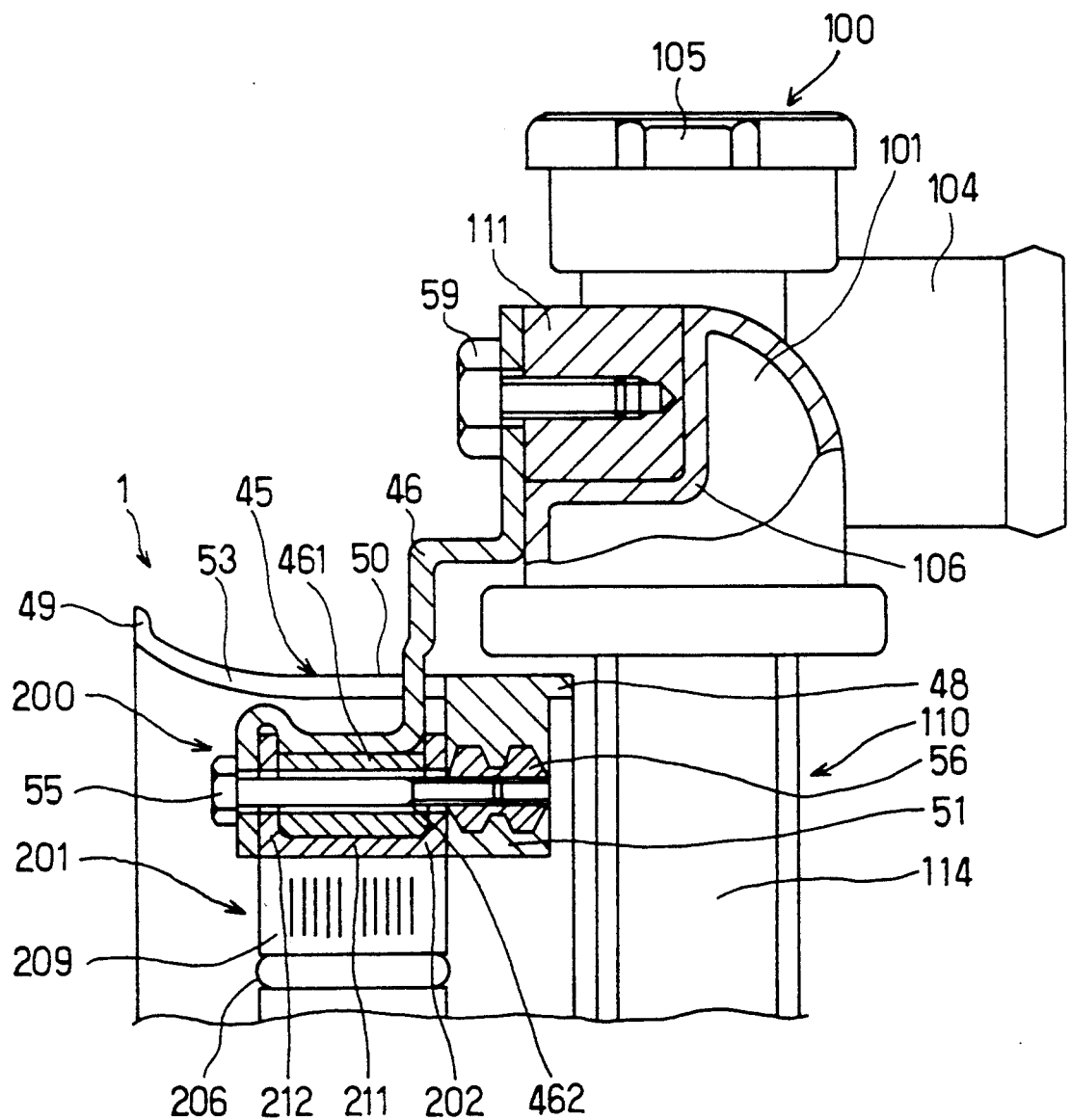
FIG. 22 is a partial enlarged sectional view of the mounting apparatus of FIG. 21.

FIGS. 21 and 22 show a structure wherein a condenser and a radiator are integrated with each other by means of a mounting apparatus for a radiator according to an eighth preferred embodiment of the present invention. The mounting apparatus includes a mounting shroud 1 of the divided type which includes a duct portion 45 which covers over an outer periphery of a condenser 200, a pair of mounting leg portions 46 securely fastened to connecting portions 106 of an upper tank 101 of a radiator 100, and another pair of mounting leg portions 46 securely fastened to fastening portions 115 of a lower tank 102 of the radiator 100. The duct portion 45 has an opposing portion 48 at an open end portion thereof adjacent the radiator 100 and includes a tubular portion 50 having an expanded mouth portion 49 at an opening end portion of the duct portion 45 remote from the radiator 100, a pair of vertical mounting walls 51 extending from an upper side portion of the tubular portion 50 toward an upper bracket 202, and another pair of vertical mounting walls 52 extending from a lower side portion of the tubular portion 50 toward a lower bracket 203.

A pair of recessed portions 53 for fitting the mounting leg portions 46 therein are formed in the upper side portion of the tubular portion 50 of the duct portion 45 of the mounting shroud 1. Another pair of recessed portions 54 for fitting the mounting leg portions 47 therein are formed similarly in the lower side portion of the tubular portion 50. Further, a pair of insert nuts 56 of an irregular profile for engaging with bolts 55 are welded in the vertical mounting walls 51. Similarly, another pair of insert nuts 58 of an irregular profile for engaging with bolts 57 are welded also in the vertical mounting walls 52.

The vertical mounting walls 51 are securely fastened to a rear wall face of the rear one of a pair of side plate portions 212 of the upper bracket 202. Similarly, the vertical mounting walls 52 are securely fastened.,to a rear wall face of the rear one of a pair of side plate portions 214 of the lower bracket 203.

The mounting leg portions 46 are securely fastened each at an end portion thereof to a front wall face of the front one of the side plate portions 212 of the upper bracket 202 by means of bolts 55. Similarly, the other mounting leg portions 47 are securely fastened each at an end portion thereof to a front wall face of the front one of the side plate portions 214 of the lower bracket 203 by means of bolts 57. The other end portions of the mounting leg portions 46 are securely fastened to insert nuts 111 in the connecting portions 106 of the upper tank 101 of the radiator 100 by means of bolts 59. Similarly, the other end portions of the mounting leg portions 47 are securely fastened to insert nuts 116 in the fastening portions 115 of the lower tank 102 of the radiator 100.

An insert member 461 for preventing possible deformation of the upper bracket 202 upon securely fastening is fitted in the upper bracket 202, and a pair of insertion holes 462 for fitting bolts 55 therein are formed in the insert member 461. Similarly, another insert member 471 for preventing possible deformation of the upper bracket 203 upon securely fastening is fitted in the upper bracket 203, and a pair of insertion holes 274 for fitting bolts 57 therein are formed in the insert member 471.

According to the mounting apparatus of the eighth embodiment, end portions of the vertical mounting walls 51 of the duct portion 45 and the mounting leg portions 46 are pressed against one of the side plate portions 212 of the upper bracket 102, and similarly, end portions of the vertical mounting walls 52 of the duct portion 45 and the mounting leg portions 47 are pressed against one of the side plate portions 214 of the lower bracket 203. In this condition, the bolts 55 and 57 are tightened so that the mounting shroud 1, which is constituted from the duct portion 45, the pair of mounting leg portions 46 and the pair of mounting leg portions 47, is mounted onto the upper and lower brackets 202 and 203.

As described above,, with the mounting apparatus of the eighth embodiment, while the profiles of the radiator 100 and the condenser 200 may be various, for example, among various models of automobiles, it is possible to cope with such variation by varying the shape of any of the duct portion 45, the mounting leg portions 46 and the mounting leg portions 47. Accordingly, the components of the mounting shroud 1 can be made common. In particular, as regards a model of an automobile wherein the shape of the duct portion 45 is same but the shape of the upper or lower tank 101 or 102 of the radiator 100 is different, it is possible to cope with this only by varying the shape of the mounting leg portions 46 or 47.

Further, the mounting leg portions 46 or 47 can be made of a different material from the duct portion 45. Consequently, when the duct 45 is made of, for example, a resin material, a metal can be used for the material of the mounting leg portions 46 or 47 for which a certain high strength is required so that the rigidity only of the mounting leg portions 46 or 47 can be increased. Further, in this instance, a resin mold for forming the duct portion 45 of a resin material can be simplified and miniaturized.

Figure 23:
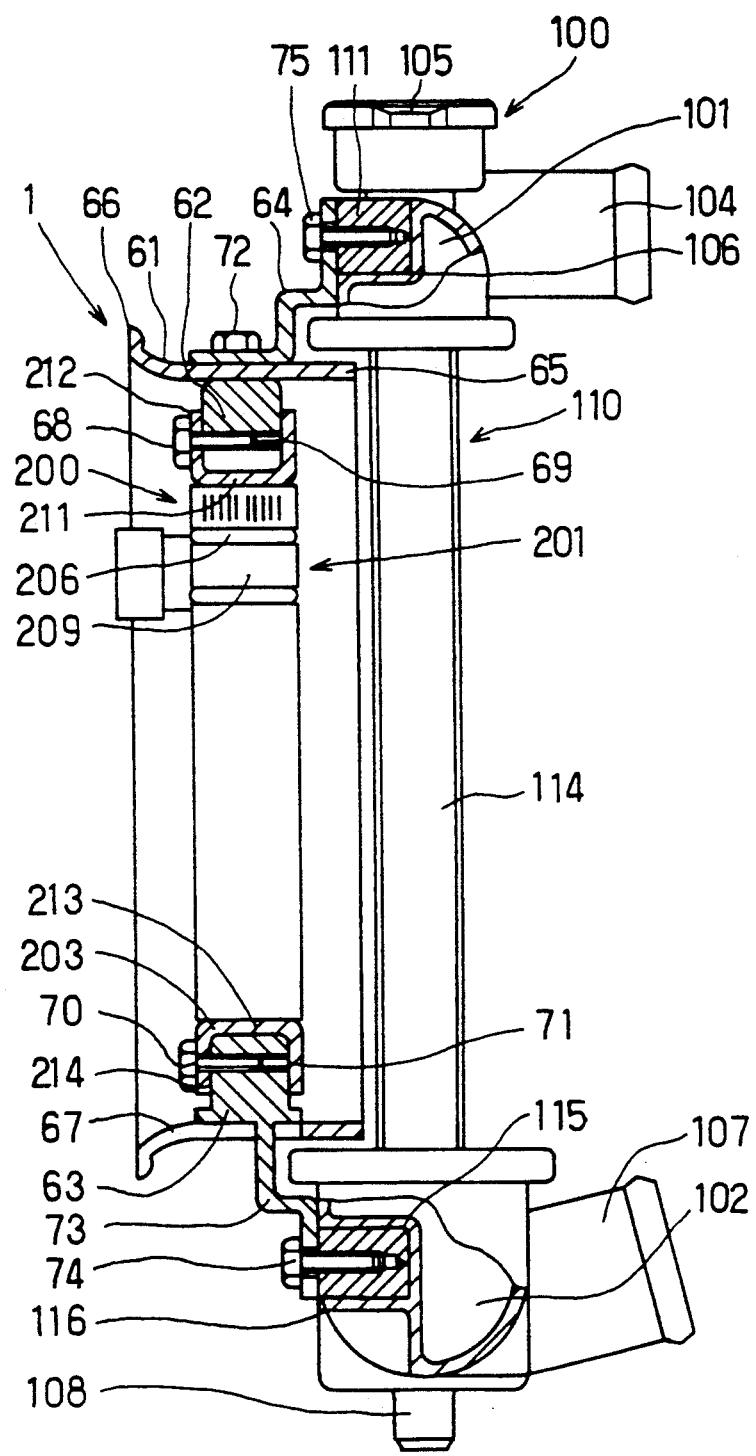
FIG. 23 is a sectional view of a yet further mounting apparatus showing a ninth preferred embodiment of the present invention.
Figure 24:
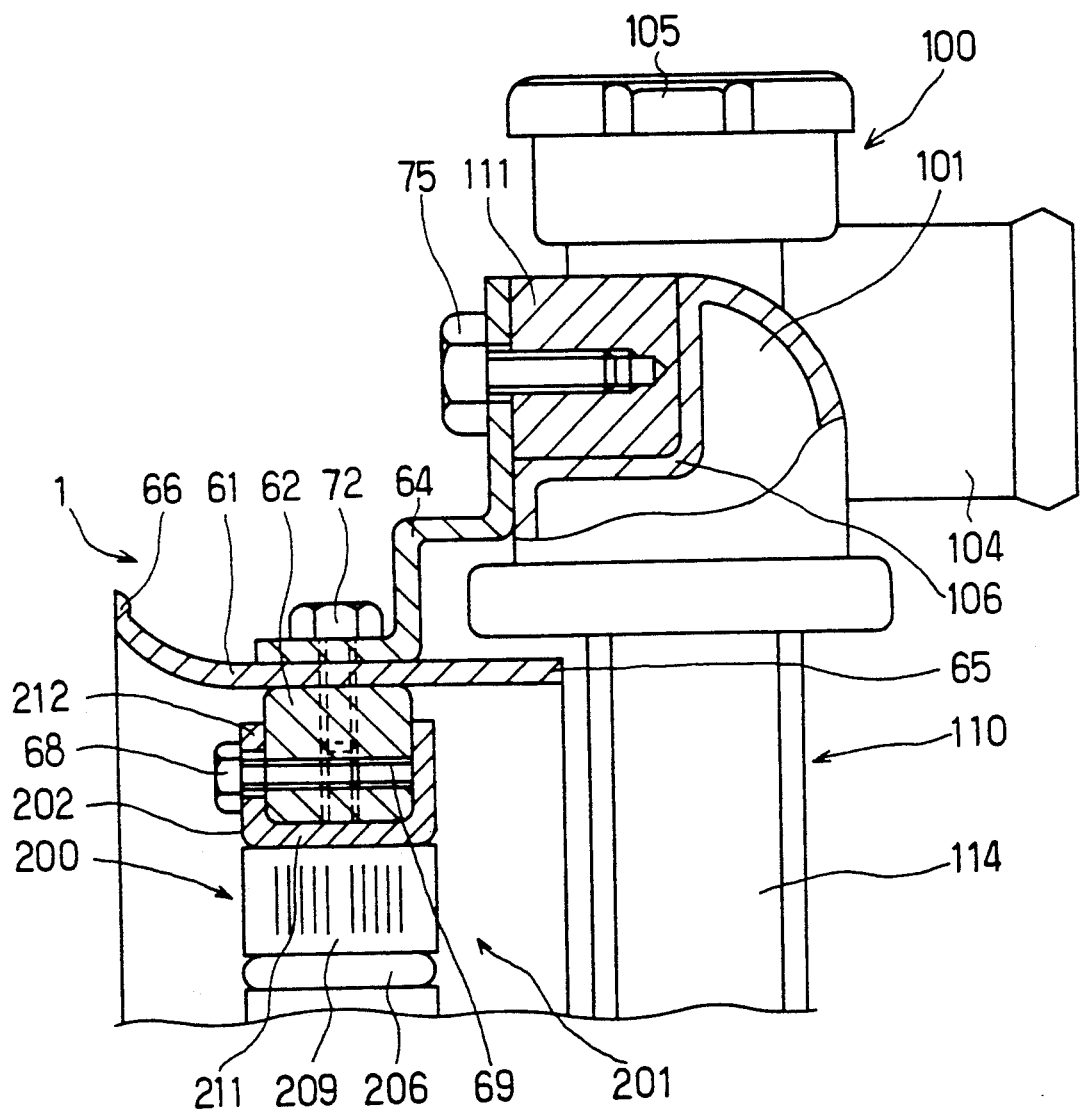
FIG. 24 is a partial enlarged sectional view of the mounting apparatus of FIG. 23.

FIGS. 23 and 24, show a structure wherein a condenser and a radiator are integrated with each other by means of a mounting apparatus for a radiator according to a ninth preferred embodiment of the present invention. The mounting apparatus includes a mounting shroud 1 of the divided type which includes a tubular portion 61 which covers over an outer periphery of a condenser 200, a vertical mounting wall 62 which serves also as a side wall for prevention of deformation of an upper bracket 202, another vertical mounting wall 63 which serves also as a side wall for prevention of deformation of a lower bracket 203, and a pair of mounting leg portions 64 secured to an upper tank 101 of a radiator 100.

An opposing portion 65 is formed at an opening end portion of the tubular portion 61 adjacent the radiator 100 while an expanded mouth portion 66 is formed at an opening end portion of the tubular portion 61 remote from the radiator 100. A pair of recessed portions 67 are formed at a lower side portion of the tubular portion 61.

The vertical mounting wall 62 is fitted in the upper bracket 202 along the longitudinal direction of the upper bracket 202 and has a pair of threaded holes 69 formed therein for engaging with bolts 68. The other vertical mounting wall 63 is fitted in the lower bracket 203 along the longitudinal direction of the lower bracket 203 and has a pair of threaded holes 71 formed therein for engaging with bolts 70. The vertical mounting wall 62 has a pair of threaded holes (not shown) for bolts 72 formed therein while the vertical mounting wall 63 has another pair of threaded holes (not shown) for bolts (not shown) formed therein. A pair of mounting leg portions 73 extend from a lower face of the vertical mounting wall 63 through the recessed portions 67. The mounting leg portions 73 are securely fastened to insert nuts 116 of fastening portions 115 of the lower tank 102 of the radiator 100 by means of bolts 74 in such a condition that end portions thereof contact with the lower tank 102 of the radiator 100.

The mounting leg portions 64 are securely fastened each at an end portion thereof to an outer face of the upper side portion of the tubular portion 61 by means of bolts 72 while the other end portions thereof are securely fastened to insert nuts 111 of the connecting portions 106 of the upper tank 101 of the radiator 100 by means of bolts 75.

With the mounting apparatus according to the present ninth embodiment, the bolts 68 and 70 are first tightened while the vertical mounting walls 62 and 63 are held between the side plate portions 212 and 214 of the upper and lower brackets 202 and 203, respectively, to mount the vertical mounting walls 62 and 63 to the upper and lower brackets 202 and 203, respectively. Then, the tubular portion 61 is placed on the upper and lower faces of the vertical mounting walls 62 and 63 and end portions of the mounting leg portions 64 are placed on the outer periphery of the tubular portion 61, and in this condition, the bolts 72 are tightened, thereby mounting the mounting shroud 1 integrally onto the upper and lower brackets 202 and 203. It is to be noted that recessed portions may additionally be formed on the upper side portion of the tubular portion 61 such that the vertical mounting wall 62 and the mounting leg portions 64 may be securely fastened to each other by tightening the bolts 72 in a condition wherein the vertical mounting wall 62 and end portions of the mounting leg portions 64 contact directly with each other. The mounting apparatus of the present ninth embodiment presents similar effects to those of the mounting apparatus of the eight embodiment described above.

Figure 25:
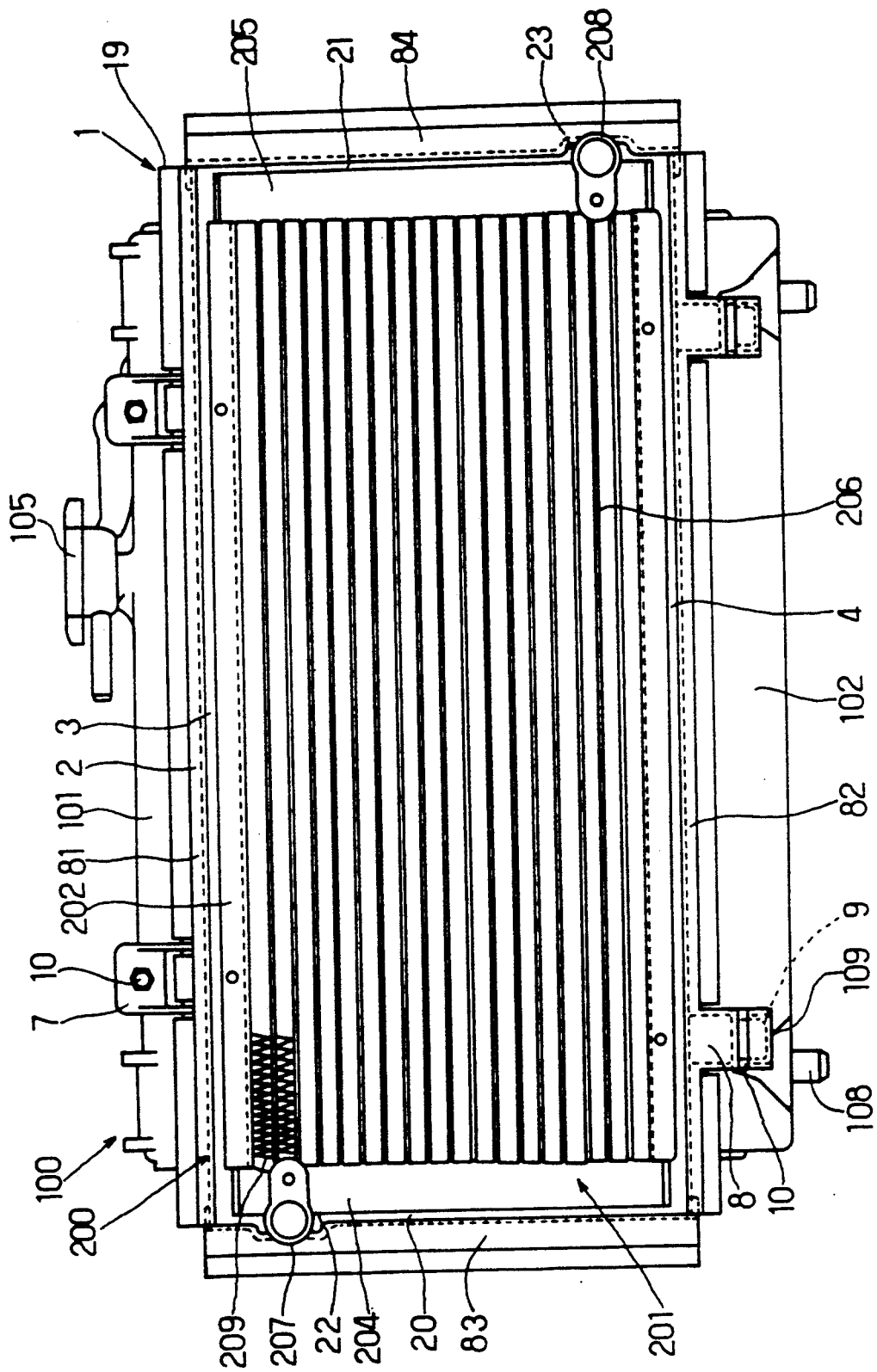
FIG. 25 is a sectional view of a yet further mounting apparatus showing a tenth preferred embodiment of the present invention.
Figure 26:
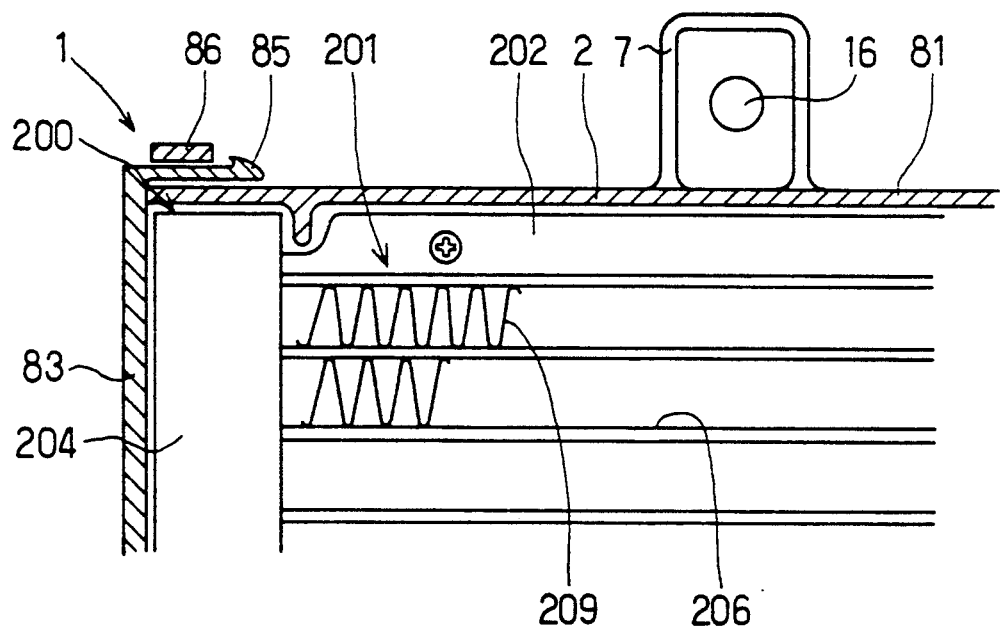
FIG. 26 is a partial enlarged sectional view of the mounting apparatus of FIG. 25.

FIGS. 25 and 26 show a structure wherein a condenser and a radiator are integrated with each other by means of a mounting apparatus for a radiator according to a tenth preferred embodiment of the present invention. The mounting apparatus includes a mounting shroud 1 having a tubular portion 2 which is divided in its circumferential direction into four side portions including an upper side portion 81, a lower side portion 82, a left side portion 83 and a right side portion 84.

An arresting pawl 86 is formed at each of the opposite end portions of the upper side portion 81 of the tubular portion 2 for engaging with an arresting piece 84 which extends substantially in a perpendicular direction from an upper end portion of each of the left and right side portions 83 and 84. Similarly, another arresting pawl (not shown) is formed at each of the opposite end portions of the lower side portion 82 for engaging with an arresting piece (not shown) which extends substantially in a perpendicular direction from a lower end portion of each of the left and right side portions 83 and 84.

A vertical mounting wall 3 having a profile similar to that of the mounting apparatus of the first embodiment is formed on an inner face of the upper side portion 81, and a pair of mounting leg portions 7 having a profile similar to that of the mounting apparatus of the first embodiment are formed on an outer face of the upper side portion 82. Meanwhile, a mounting wall 4 having a profile similar to that of the mounting apparatus of the first embodiment is formed on an inner face of the lower side portion 82, and a pair of mounting leg portions 8 having a profile similar to that of the mounting apparatus of the first embodiment is formed on an outer face of the lower side portion 82.

With the mounting apparatus of the present tenth embodiment, since the tubular portion 2 of the mounting shroud 1 is divided into four portions, even with regard to the vertical dimension and/or the widthwise dimension of the heat exchanging section of the radiator 100 which may be different for different models of automobiles, it is possible to cope with them by varying the dimensions and the profile of any of the upper and lower side portions 81 and 82 and the left and right side portions 83 and 84. It is to be noted that, depending upon the structure of the radiator 100 and the condenser 200, alternatively upper and lower portions of the condenser 200 may be securely fastened only by the upper and lower side portions 81 and 82 while packings are disposed between an entrance header tank 204 and an exit header tank 205 of the condenser 200 and the opposite end portions of the upper and lower side portions 81 of the condenser 200.

Figure 27:
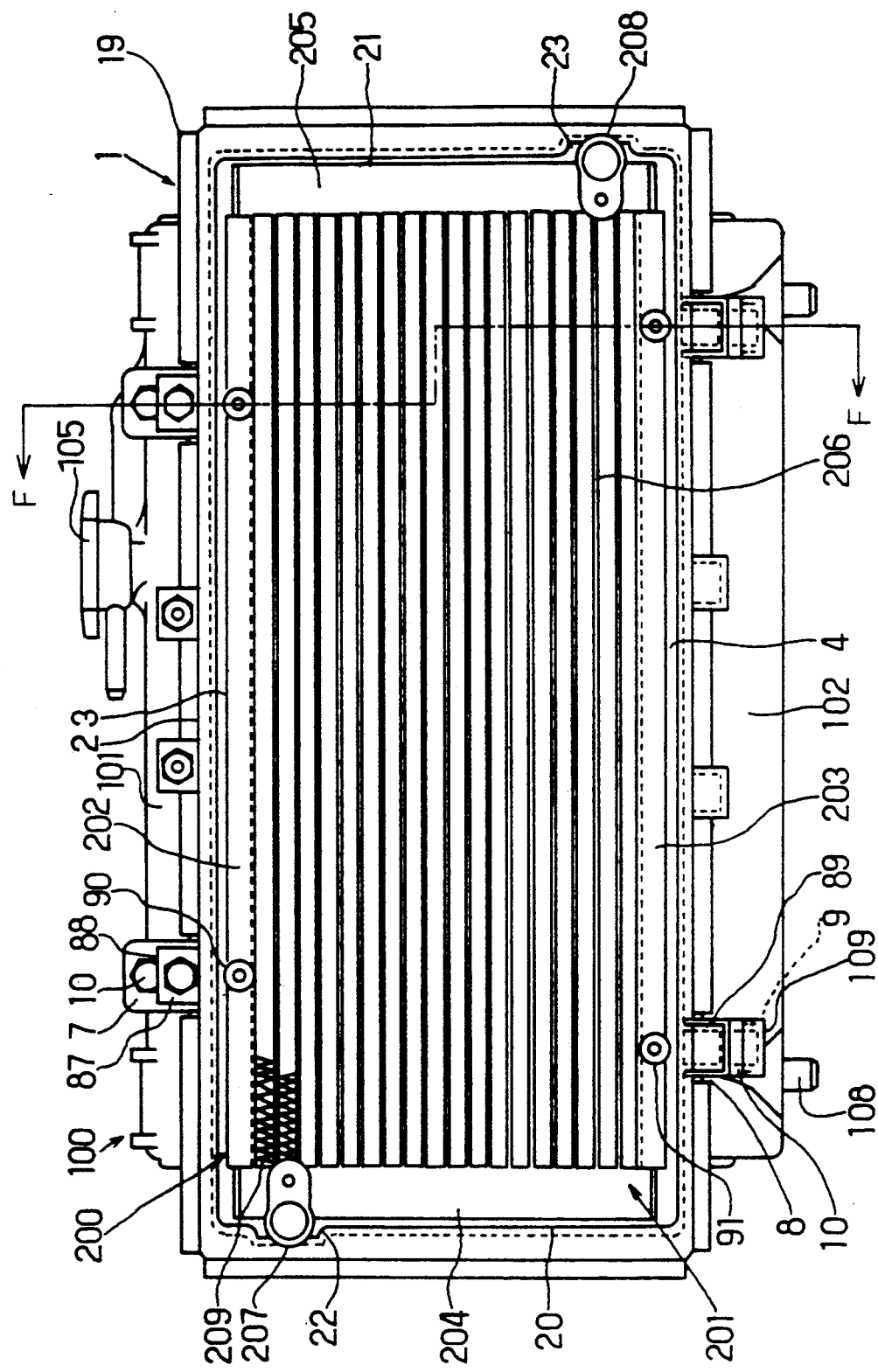
FIG. 27 is a sectional view of a yet further mounting apparatus showing an eleventh preferred embodiment of the present invention.
Figure 28:
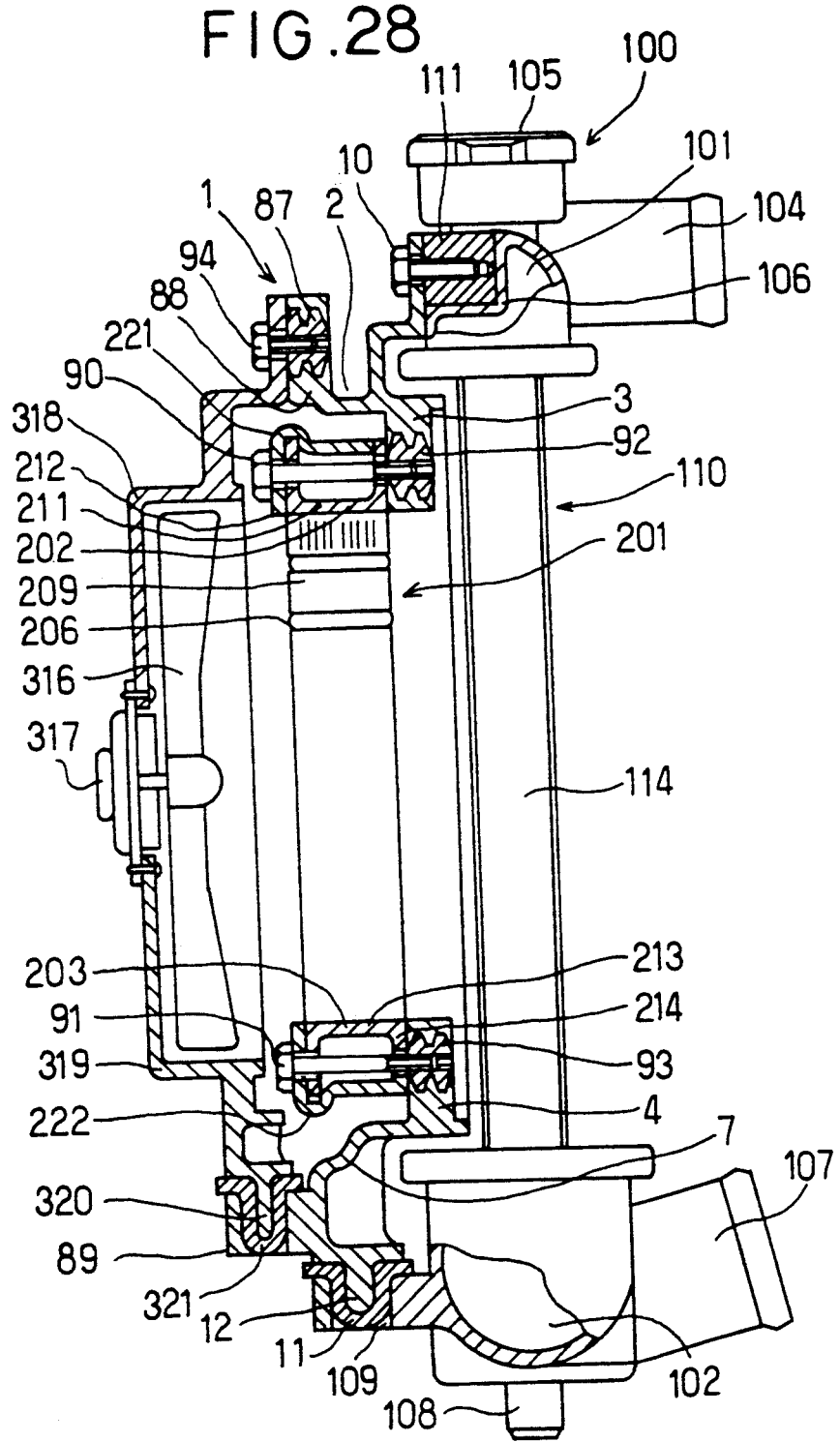
FIG. 28 is an enlarged sectional view taken along line F—F of FIG. 27.
Figure 29:
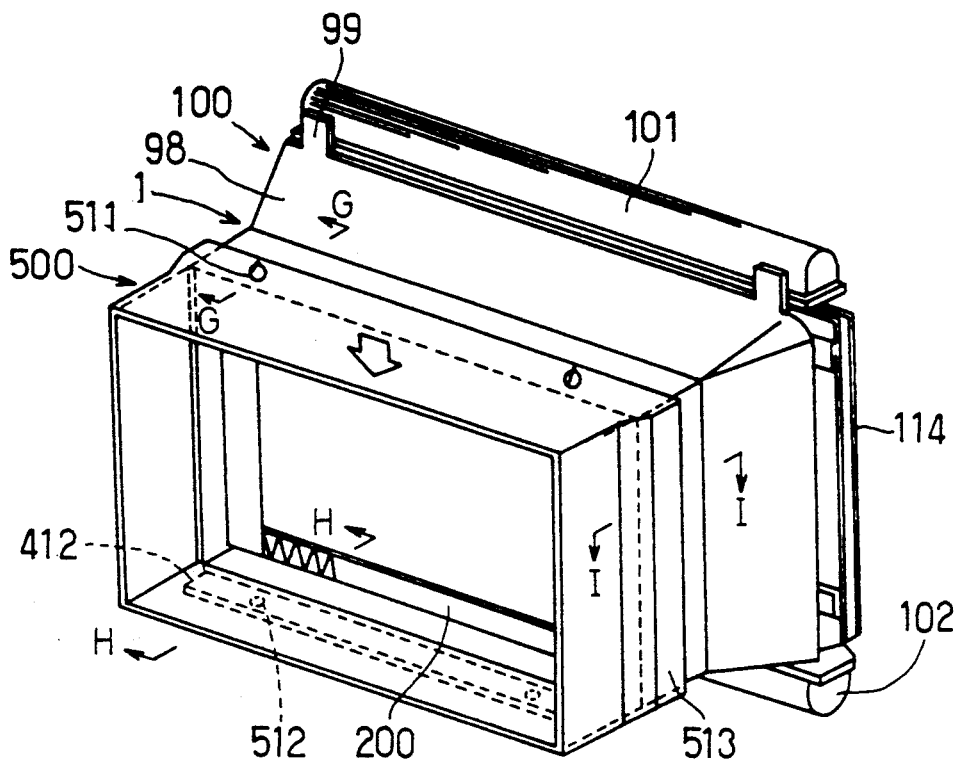
FIG. 29 is a perspective view of a yet further mounting apparatus showing a twelfth preferred embodiment of the present invention.

FIGS. 27 and 28 show structures wherein a condenser and a radiator are integrated with each other and a cooling fan, the condenser and wherein the radiator are integrated with each other, respectively, by means of a mounting apparatus for a radiator according to an eleventh preferred embodiment of the present invention. The mounting apparatus includes a mounting shroud 1 wherein part of an expanded mouth portion 19 of an upper side portion of a tubular portion 2 thereof remote from a radiator 100 is formed as a mounting angle 88 to which a pair of insert nuts 87 of an irregular profile are welded. A pair of engaging recesses 89 for securing a lower portion of a cooling fan 316 are formed at a lower side portion of the tubular portion 2.

Two pairs of insert nuts 92 and 93 of an irregular profile for engaging with bolts 90 and 91 are welded to vertical mounting walls 92 and 93, respectively, which extend inwardly from the upper and lower side portions of the tubular portion 2. It is to be noted that the vertical mounting wall 3 is securely fastened to a rear wall face of the rear one of a pair of side plate portions 212 of an upper bracket 202 by means of the bolts 90. Similarly, the vertical mounting wall 4 is securely fastened to a rear wall face of a rear one of a pair of side plate portions 214 of a lower bracket 203 by means of the bolts 91.

An end portion of a mounting leg portion 318 on which an upper portion of an electric motor 317 for the cooling fan 316 is held is securely fastened to the mounting angle 88 by means of a bolt 94. Meanwhile, a pair of engaging projections 320 are formed at an end portion of a mounting leg portion 319 on which a lower portion of the electric motor 317 for the cooling fan 316 is held. The engaging projections 320 are fitted in the engaging recesses 89 of the lower side portion of the tubular portion 2 each together with a rubber bush 321. Further, a pair of angles 221 and 222 for preventing possible deformation of the upper and lower brackets 202 and 203 upon securely fastening are mounted on the upper and lower brackets 202 and 203, respectively.

In the mounting apparatus of the eleventh embodiment, the condenser 200 is first secured to the mounting shroud 1., and then the cooling fan 316 is secured to the mounting shroud 1. Then, the mounting shroud 1 to which the condenser 200 and the cooling fan 316 are secured is securely fastened to the radiator 100. Consequently, the cooling fan 316 can be mounted onto the radiator 100 together with the condenser 200.

FIGS. 29 to 33 show a structure wherein a condenser and a radiator are integrated with each other by means of a mounting apparatus for a radiator according to a twelfth preferred embodiment of the present invention. The mounting apparatus includes a mounting shroud 1 for mounting a condenser 200 onto a radiator 100. A wind introducing duct 500 for effectively preventing air having passed the radiator 100 from coming around to the front of the condenser 200 is coupled to a front side of the mounting shroud 1. A tubular portion 98, a vertical mounting wall (not shown) and a pair of mounting leg portions 99 are formed integrally and continuously on the mounting shroud 1.

Figure 30:
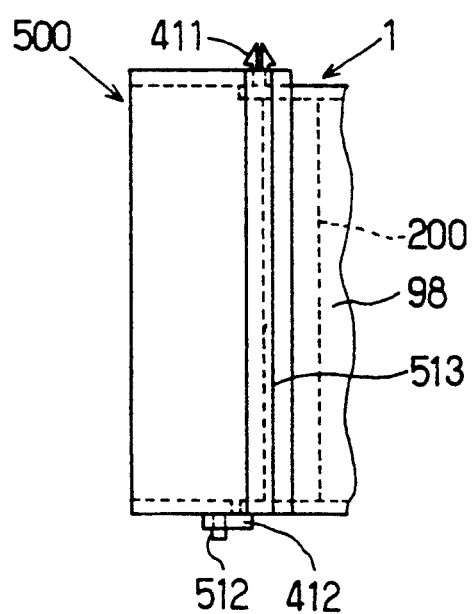
FIG. 30 is a side elevational view of the mounting apparatus of FIG. 29.
Figure 31:
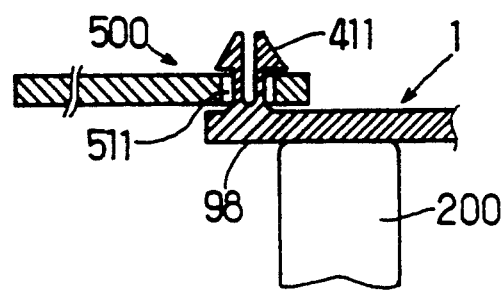
FIG. 31 is a sectional view taken along line G—G of FIG. 29.

A pair of snap pins 411 serving as arresting portions for arresting the wind introducing duct 500 are provided uprightly in FIGS. 30 and 31 at an opening end portion of an upper side portion of the tubular portion 98 remote from the radiator 100. Each of the snap pins 411 has an end having a substantially conical profile and so shaped as to be resiliently deformed.

Figure 32:
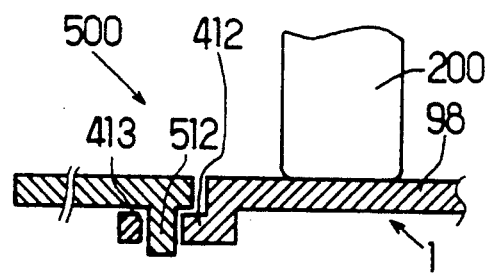
FIG. 32 is a sectional view taken along line H—H of FIG. 29.

A shelf portion 412 is formed at an opening end portion of a lower side portion of the tubular portion 98 remote from the radiator 100 such that it is offset downwardly in FIGS. 30 and 32 by an amount equal to the thickness of the wind introducing duct 500 from the remaining portion and extends forwardly farther than the upper, left and right side portions of the tubular portion 98. A pair of arresting holes 413 serving as arresting portions for arresting the wind introducing duct 500 are formed in the shelf portion 412. A rail portion 414 serving as an arresting portion for arresting the wind introducing duct 500 is formed on an outer face of each of the left and right side portions of the tubular portion 98 such that it extends over the entire left or right side portion.

Figure 33:
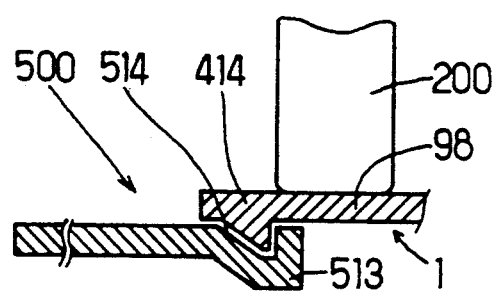
FIG. 33 is a sectional view taken along line I—I of FIG. 29.

The wind introducing duct 500 is in the form of a rectangular tubular frame member made of a resin material and has upper and lower side portions and left and right side portions formed integrally and continuously thereon. Opening end portions of the upper, left and right side portions of the wind introducing duct 500 adjacent the condenser 200 are fitted on outer peripheries of the upper, left and right side portions of the tubular portion 98 of the mounting shroud 1 while the lower side portion of the tubular portion 98 is fitted on the inner side of the shelf portion 412. A pair of fitting holes 511 are formed at an opening end portion of the upper side portion of the wind introducing duct 500 adjacent the condenser 200 and serve as receiving portions for being fitted with the snap pins 411 formed on the upper-side portion of the tubular portion 98. The inner diameter of the fitting holes 511 is smaller than the outer diameter of end portions of the snap pins 411. Meanwhile, a pair of hub portions 512 are formed at an opening end portion of the lower side portion of the wind introducing duct 500 and serve as receiving portions for being fitted in the arresting holes 413 formed in the shelf portion 412 of the tubular portion 98 as shown also in FIGS. 30 and 32. A pair of outwardly swollen portions 513 are formed at opening end portions of the left and right side portions of the wind introducing duct 500 as shown in FIG. 33. Grooves 514 are formed on inner faces of the swollen portions 513 and adapted to be engaged with the rail portions 414 formed on the left and right side portions of the tubular portion 98.

A procedure of mounting the wind introducing duct 500 onto the mounting shroud 1 of the mounting apparatus of the present twelfth embodiment will be described subsequently with reference to FIGS. 29 to 33.

First, the grooves 514 of the left and right side portions of the wind introducing duct 500 are fitted with the rail portions 414 of the left and right side portions of the tubular portion 98, and while this condition is maintained, the wind introducing duct 500 is slidably moved from the upper to the lower side of the mounting shroud 1. Then, when the lower side portion of the wind introducing duct 500 comes to the shelf portion 412, the hub portions 512 of the lower side portion of the wind introducing duct 500 are fitted into the arresting holes 413 of the shelf portion 412. Simultaneously, end portions of the snap pins 411 on the upper side portion of the tubular portion 98 are fitted into and projected from the fitting holes 511 of the upper side portion of the light introducing duct 500. Consequently, the wind introducing duct 500 is secured to the mounting shroud 1.

As described above, with the mounting apparatus of the twelfth embodiment, since the wind introducing duct 500 is mounted in front of the mounting shroud 1, it can be prevented that, for example, heated air discharged from an engine room (air having passed the condenser 200 and the radiator 100) comes around to a location in the proximity of a front bumper of the automobile or comes around through a hole in the rear of a headlamp. Consequently, it can be prevented completely that heated air comes around to the front of the condenser 200.

Figure 34:
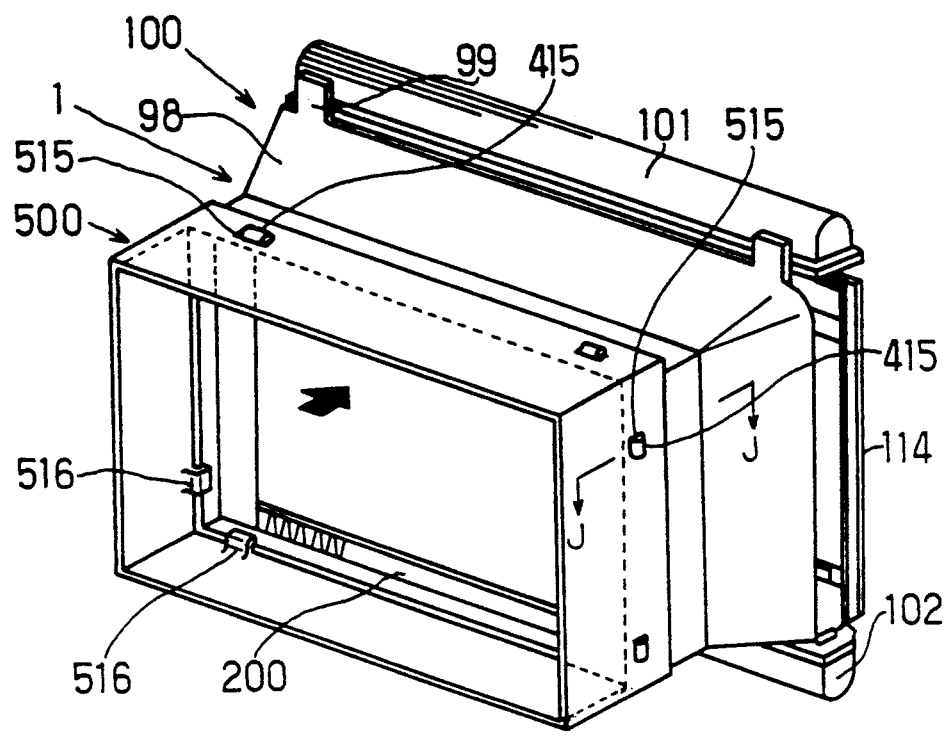
FIG. 34 is a perspective view of a yet further mounting apparatus showing a thirteenth preferred embodiment of the present invention.
Figure 35:
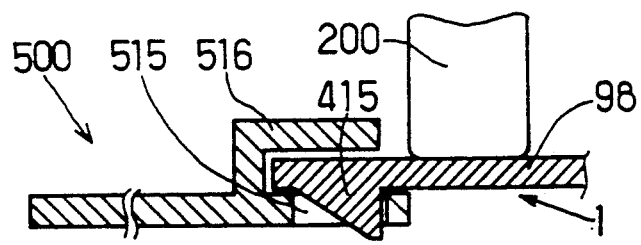
FIG. 35 is a sectional view showing a mounting structure on a wind introducing duct on a mounting shroud by the mounting apparatus of FIG. 34.

FIGS. 34 and 35 show a structure wherein a condenser and a radiator are integrated with each other by means of a mounting structure for a radiator according to a thirteenth preferred embodiment of the present invention and a mounting structure of a wind introducing duct on a mounting shroud, respectively. According to the structure, a wind introducing duct 500 is mounted onto a mounting shroud 1 from the front of the mounting shroud 1.

It is to be noted that a pair of projection pawls 415 serving as arresting portions are formed, as shown also in FIG. 35, on an outer face of each of opening end portions of the upper and lower side portions and the left and right side portions of the tubular portion 98 remote from a radiator 100. Meanwhile, a pair of fitting holes 515 serving as receiving portions for being arrested by the projection pawls 415 are formed, as shown also in FIG. 35, on an outer face of each of opening end portions of the upper and lower side portions and the left and right side portions of the wind introducing duct 500. Engaging pawls 516 for engaging with an inner face of the tubular portion 98 extend above the locations where the fitting holes 515 are formed such that they cover over the fitting holes 515.

Figure 36:
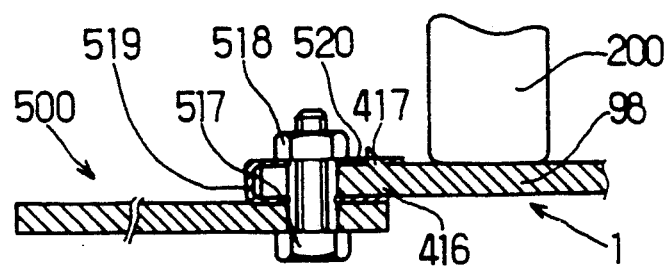
FIG. 36 is a sectional view of a mounting structure on a wind introducing duct by a yet further mounting apparatus showing a fourteenth preferred embodiment of the present invention.

FIG. 36 shows a mounting structure of a wind introducing duct on a mounting shroud of a mounting apparatus for a condenser according to a fourteenth preferred embodiment of the present invention. In the mounting apparatus, as securing means between a tubular portion 98 of a mounting shroud 1 and a wind introducing duct 500, a bolt 517 for tightening the wind introducing duct 500 from an outer periphery side, a nut 513 for engaging with the bolt 517 and a snap member 519 secured to the nut 518 by suitable means such as welding are employed. The snap member 519 has a channel-shaped profile such that it covers over inner and outer peripheral faces of a fastening portion 416 at a front portion of the tubular portion 98. The snap member 519 has a fitting hole 520-formed therein in which a projected portion 417 formed on the inner peripheral face of the tubular portion 98 is fitted.

Figure 37:
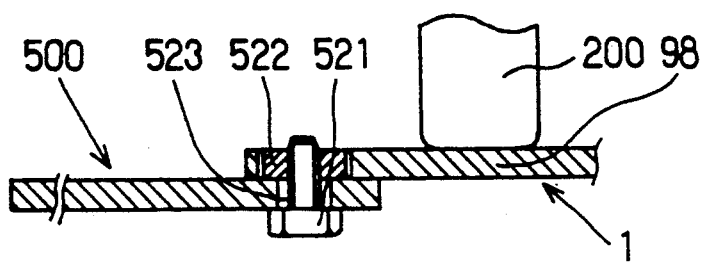
FIG. 37 is a sectional view of a mounting structure on a wind introducing duct by a yet further mounting apparatus showing a fifteenth preferred embodiment of the present invention.
Figure 38:
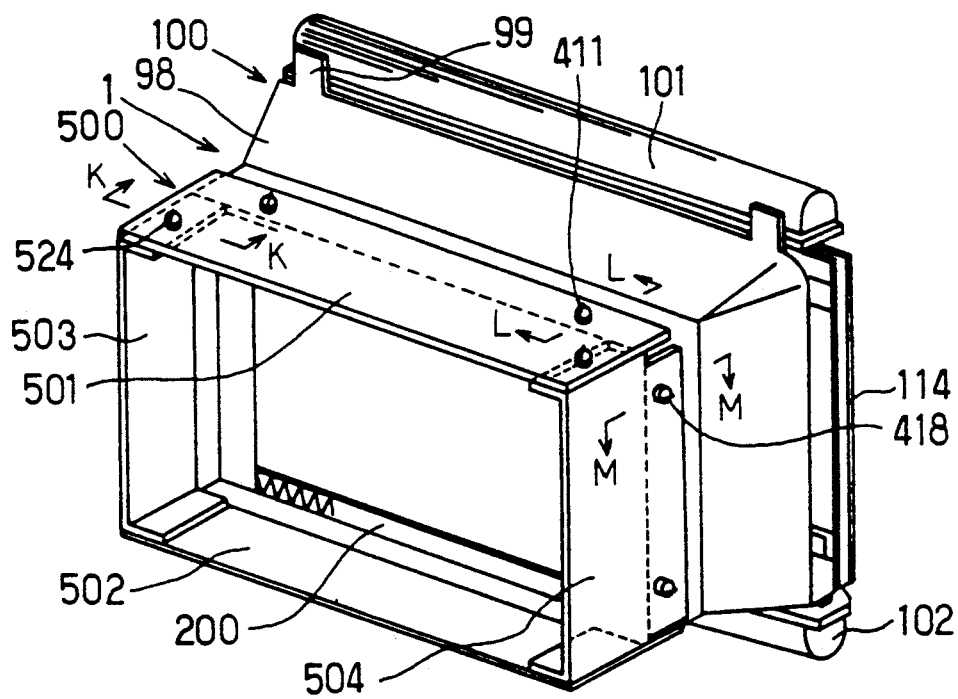
FIG. 38 is a perspective view of a yet further mounting apparatus showing a sixteenth preferred embodiment of the present invention.

FIG. 37 shows a mounting structure of a wind introducing duct on a mounting shroud of a mounting apparatus for a condenser according to a fifth preferred embodiment of the present invention. In the mounting apparatus, as securing means between a tubular portion 98 of a mounting shroud 1 and a wind introducing duct 500, a bolt 521 for tightening the wind introducing duct 500 from an outer periphery side and a nut 522 fitted in the tubular portion 98 for engaging with the bolt 521. It is to be noted that an insertion hole 523 for the bolt 521 is formed at an opening end portion of the wind introducing duct 500 adjacent a condenser 200.

FIGS. 38 to 41 show a structure wherein a condenser and a radiator are integrated with each other by means of a mounting apparatus for a radiator according to a sixteenth preferred embodiment of the present invention. The mounting apparatus includes a wind introducing duct 500 wherein an upper side portion 501, a lower side portion 502, a left side portion 503 and a right side portion 504 are formed separately from one another.

Figure 39:
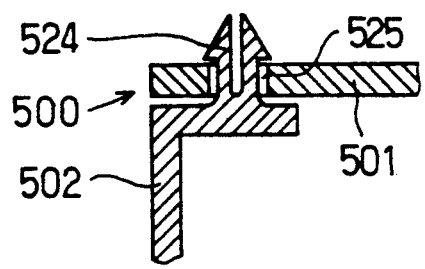
FIG. 39 is a sectional view taken along line J—J of FIG. 38.
Figure 40:
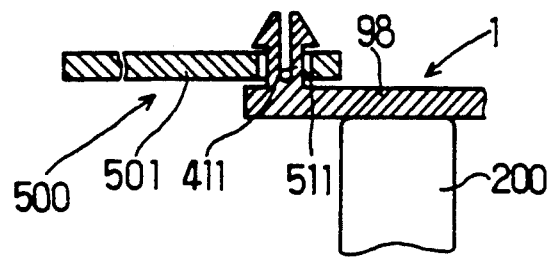
FIG. 40 is a sectional view taken along line K—K of FIG. 38.
Figure 41:
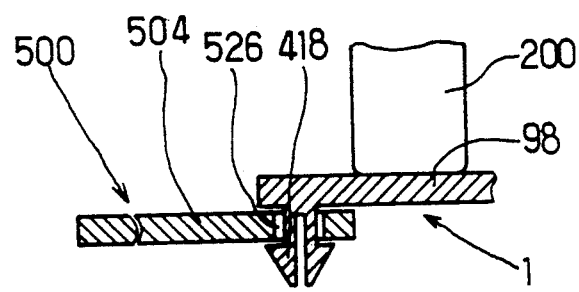
FIG. 41 is a sectional view taken along line L—L of FIG. 38.

A pair of fitting holes 525 are formed, as shown also in FIG. 39, at an opening end portion of each of the upper and lower side portions 501 and 502 of the wind introducing duct 500 adjacent a condenser 200 such that they are fitted with snap pins 524 formed on each of the left and right side portions 503 and 504 of the wind introducing duct 500. Another pair of fitting holes 511 are formed, as also shown in FIG. 40, at an opening end portion of each of the upper and lower side portions 501 and 502 adjacent the condenser 200 such that they are fitted with snap pins 411 formed on each of upper and lower side portions of the tubular portion 98. Further, as also shown in FIG. 41, a further pair of fitting holes 526 are formed at an opening end portion of each of the left and right side portions 503 and 504 of the wind introducing duct 500 adjacent the condenser 200 such that they are fitted with snap pins 418 formed on each of the left and right side portions of the tubular portion 98.

It is to be noted that, as securing means between the upper and lower side portions 501 and 502 and the left and right side portions 503 and 504 of the wind introducing duct 500, such securing means which makes use of a bolt and a nut as in the mounting apparatus of the fourteenth or fifteenth embodiment described above may be employed alternatively.

Figure 42:
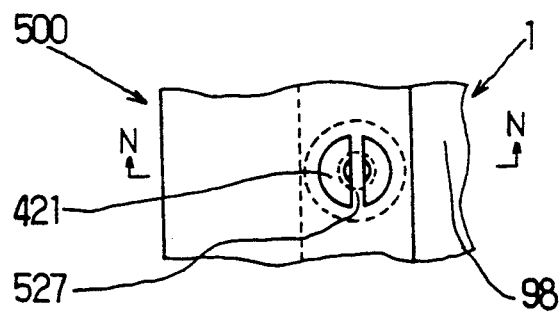
FIG. 42 is a top plan view of a mounting structure of a wind introducing duct on a mounting shroud showing a seventeenth preferred embodiment of the present invention.
Figure 43:
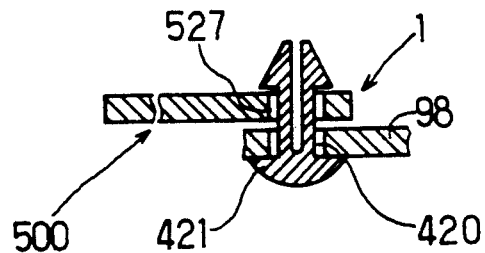
FIG. 43 is a sectional view taken along line M—M of FIG. 42.

FIGS. 42 and 43 show a mounting structure of a wind introducing duct on a mounting shroud of a mounting apparatus for a radiator according to a seventh preferred embodiment of the present invention. In the present mounting apparatus, snap pins 421 are inserted in fitting holes 420 formed in a tubular portion 98 of a mounting shroud 1 and fitting holes 527 formed in a wind introducing duct 500 to secure the tubular portion 98 and the wind introducing duct 500 at the opposite end portions of the snap pins 421. It is to be noted that the snap pins 421 used are formed separately from the tubular portion 98 and the wind introducing duct 500.

Figure 44:
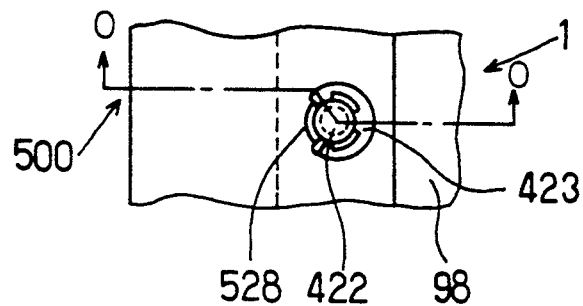
FIG. 44 is a top plan view of a mounting structure of a wind introducing duct on a mounting shroud showing an eighteenth preferred embodiment of the present invention.
Figure 45:
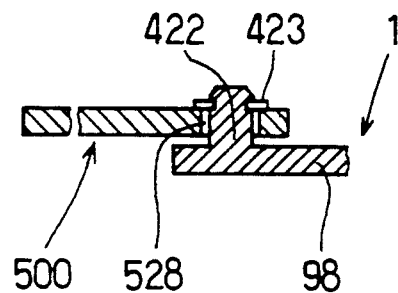
FIG. 45 is a sectional view taken along line N—N of FIG. 44.

FIGS. 44 and 45 show a mounting structure of a wind introducing duct on a mounting shroud of a mounting apparatus for a condenser according to an eighteenth preferred embodiment of the present invention. In the mounting apparatus of the eighteenth embodiment, a hub portion 422 formed at an opening end portion of a tubular portion 98 of a mounting shroud 1 remote from a radiator 100 is first inserted into an arresting hole 528 formed at an opening end portion of a wind introducing duct 500 adjacent a condenser 200, and then an E-snap ring 423 is fitted to a portion of the hub portion 422 projected from the arresting hole 528 to prevent coming off of the hub portion 522, thereby securing the wind introducing duct 500 to the mounting shroud 1.

Figure 46:
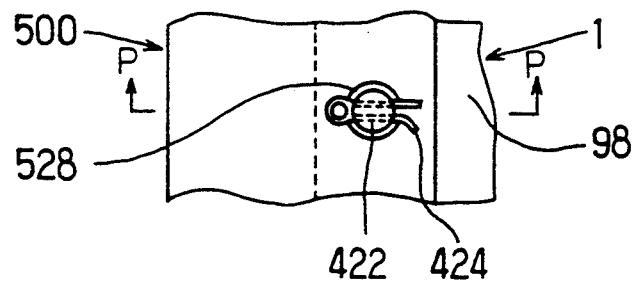
FIG. 46 is a top plan view of a mounting structure of a wind introducing duct on a mounting shroud showing a nineteenth preferred embodiment of the present invention.
Figure 47:
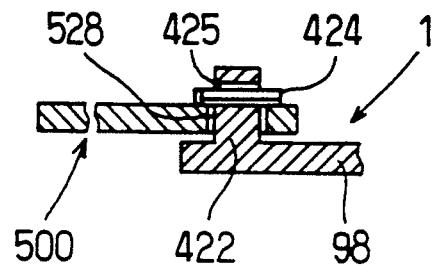
FIG. 47 is a sectional view taken along line O—O of FIG. 46.

FIGS. 46 and 47 show a mounting structure of a wind introducing duct on a mounting shroud of a mounting apparatus for a condenser according to a nineteenth preferred embodiment of the present invention. In the mounting apparatus of the nineteenth embodiment, a hub portion 522 formed at an opening end portion of a tubular portion 98 of a mounting shroud 1 remote from a radiator 100 is first inserted into an arresting hole 528 formed at an opening end portion of a wind introducing duct 500 adjacent a condenser 200, and then a cotter pin of a substantially U shape is inserted into a through-hole 425 formed in the hub portion 422 to prevent coming off of the hub portion 422, thereby securing the wind introducing duct 500 to the mounting shroud 1.

Figure 48:
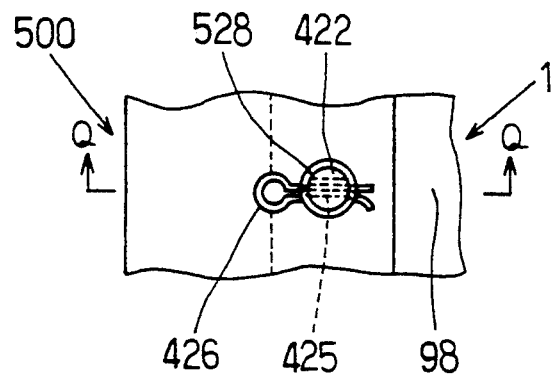
FIG. 48 is a top plan view of a mounting structure of a wind introducing duct on a mounting shroud showing a twentieth preferred embodiment of the present invention.
Figure 49:
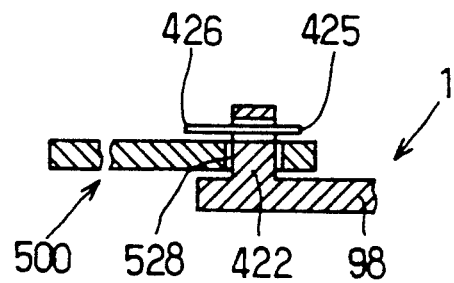
FIG. 49 is a sectional view taken along line P—P of FIG. 48.

FIGS. 48 and 59 show a mounting structure of a wind introducing duct on a mounting shroud of a mounting apparatus for a condenser according to a twentieth preferred embodiment of the present invention. In the mounting apparatus of the twentieth embodiment, a hub portion 422 formed at an opening end portion of a tubular portion of a mounting shroud 1 remote from a radiator 100 is first inserted into an arresting hole 528 formed at an opening end portion of a wind introducing duct 500 adjacent a condenser 200, and then part of a snap pin 426 is inserted into a through-hole 425 formed in the hub portion 422 to prevent coming off of the hub portion 422, thereby securing the wind introducing duct 500 to the mounting shroud 1.

Figure 50:
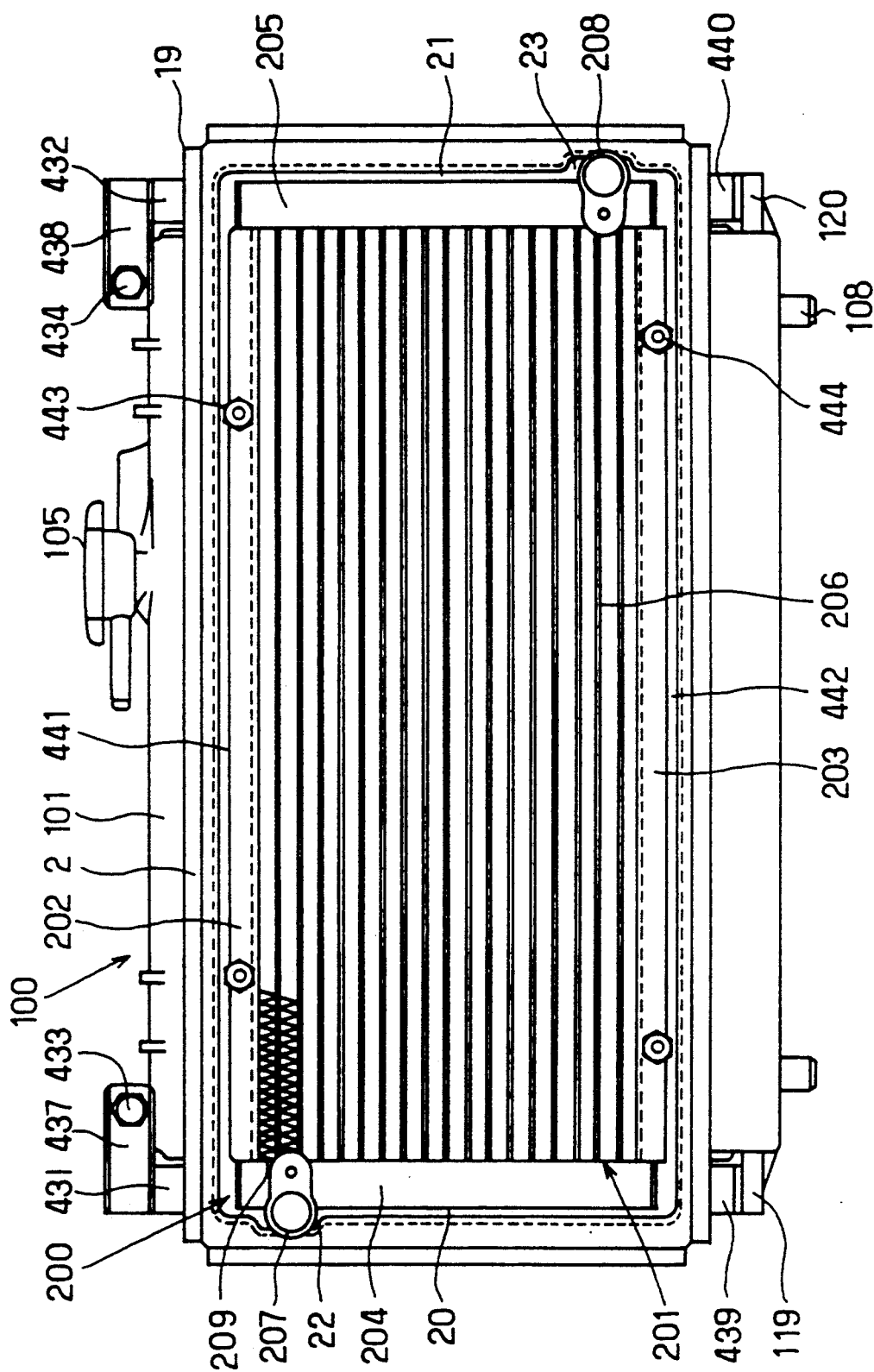
FIG. 50 is a front elevational view of a yet further mounting apparatus showing a twenty first preferred embodiment of the present invention.
Figure 51:
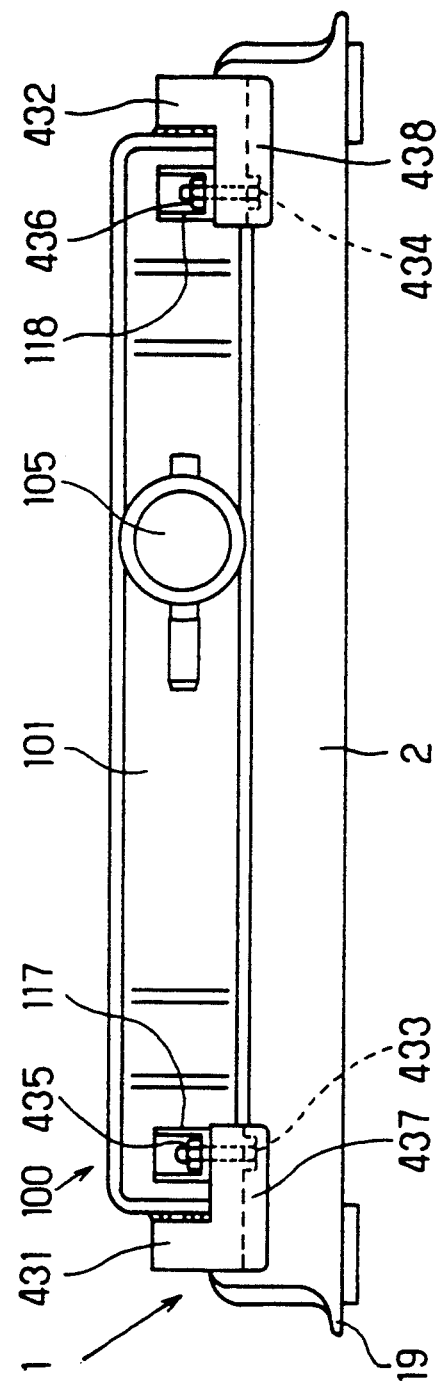
FIG. 51 is a top plan view of the mounting apparatus of FIG. 50.
Figure 52:
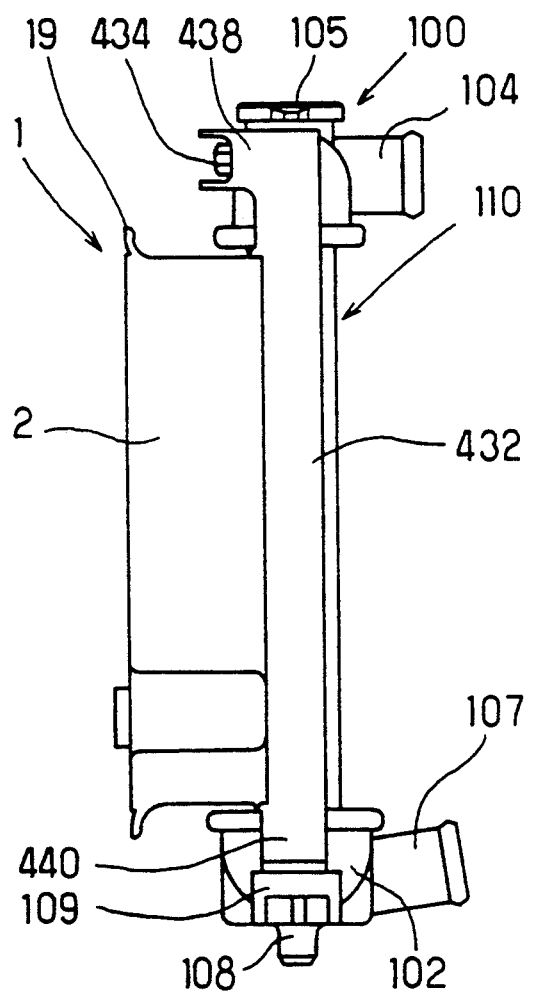
FIG. 52 is a side elevational view of the mounting apparatus of FIG. 50.

FIGS. 50 to 52 show a structure wherein a condenser and a radiator are integrated with each other by means of a mounting apparatus for a radiator according to a twenty first preferred embodiment of the present invention. A sideward portion 431 is formed at a left side portion of a tubular portion 2 of a mounting shroud 1 such that it extends from the left side portion of the tubular portion 2 to an outer periphery of a left side end of a heat exchanging portion 110 of a radiator 10.0.

Another sideward portion 432 is formed similarly at a right side portion of the tubular portion 2 such that it extends from the right side portion of the tubular portion 2 to an outer periphery of a right side end of the heat exchanging portion 110 of the radiator 100. A pair of substantially L-shaped mounting leg portions 437 and 438 are formed integrally and continuously at upper end portions of the left and right sideward 431 and 432 and are securely fastened to fastening portions 117 and 118 of an upper tank 101 of the radiator 100 by means of bolts 433 and 434 and nuts 435 and 436, respectively. Similarly, mounting leg portions 439 and 440 are formed integrally and continuously at lower end portions of the left and right sideward portions 431 and 432 and each has an engaging projection (not shown). The engaging projections are fitted in a pair of engaging recesses 119 and 120 formed at the opposite side ends of a lower tank 102 of the radiator 100.

A plurality of ribs (not shown) for reinforcing the left and right sideward portions 431 and 432 are formed on each of the sideward portions 431 and 432 adjacent the radiator 100. Also on a face of each of the mounting leg portions 437 and 438 adjacent the radiator 100, a plurality of ribs (not shown) are formed for reinforcing the mounting leg portions 437 and 438. It is to be noted that vertical mounting walls 441 and 442 formed on inner faces of the upper and lower side portions of the tubular portion 2 are securely fastened to the upper and lower brackets 202 and 203 by means of bolts 443 and 444, respectively.

With the mounting apparatus of the present twenty first embodiment, since the mounting leg portions 437 and 438 are disposed on the left and right side portions of the tubular portion 2, there is no necessity of assuring spacings between the left and right side portions of the tubular portion 2 and a partition wall (not shown) such as a radiator upper support or a front cross member. Consequently, even with a model of an automobile wherein such spacing cannot be assured till now, the condenser 200 can be carried on the automobile, and accordingly, the limitation in model of an automobile on which the condenser 200 is carried is eliminated.

While, in the mounting apparatus of the embodiments described above, the mounting leg portions are mounted on the upper and lower tanks, they may otherwise be mounted on a part which is secured to a car body or else may be mounted directly on a car body.

Having now fully described the invention, it will be apparent to one of ordinary skill in the art that many changes and modifications can be made thereto without departing from the spirit and scope of the invention as set forth herein.

What is claimed is:

1. A mounting apparatus for a condenser for mounting on a receiving member a condenser which includes a heat exchanging section for converting gaseous coolant into liquid coolant by heat exchange and a bracket secured to a side portion of said heat exchanging section, comprising:
   a tubular element for covering over an outer periphery of said condenser;
   a vertical mounting wall element disposed on and secured to an inner periphery of said tubular element so as to be held in contact with said bracket; and
   a mounting leg element disposed on an outer periphery of said tubular element for being secured to said receiving member.

2. A mounting apparatus for a condenser according to claim 1, wherein said condenser includes a pair of header sections for storing coolant therein, and a plurality of tubes communicating said header sections with each other for flowing coolant therethrough.

3. A mounting apparatus for a condenser according to claim 2, wherein said bracket has a channel-shaped cross section and has a base plate portion disposed on said heat exchanging section and a pair of side plate portions extending from the opposite side ends of said base plate portion, one of said side plate portions of said bracket being secured to said vertical mounting wall element.

4. A mounting apparatus for a condenser according to claim 3, wherein said bracket is provided by a pair which are disposed in an opposing relationship to each other, and one of the brackets is secured at an inner face of one of said side plate portions thereof to said vertical mounting wall element while the other bracket is secured at an outer face of a corresponding one of said side plate portions thereof to said vertical mounting wall element.

5. A mounting apparatus for a condenser according to claim 1, wherein said mounting leg element is secured to a tank member of a radiator for an automobile.

6. A mounting apparatus for a condenser according to claim 1, wherein said tubular element is a rectangular tubular frame member and said mounting leg element is provided on an outer face of each of an upper side portion and a lower side portion of said rectangular tubular frame member, and said mounting leg element on the lower side portion of said rectangular tubular frame member is fitted in an engaging recess formed on a lower tank of a radiator for an automobile while said mounting leg element on the upper side portion of said rectangular tubular frame member is secured to an upper tank of said radiator.

7. A mounting apparatus for a condenser according to claim 1, wherein said vertical mounting wall element, said mounting leg element and said tubular element are formed integrally and continuously from a resin material.

8. A mounting apparatus for a condenser according to claim 5, wherein an opening end portion of said tubular element adjacent said radiator is opposed to said heat exchanging section of said radiator and forms an air passageway sectioned between said condenser and said radiator.

9. A mounting apparatus for a condenser according to claim 8, wherein a dividing wall for dividing the air passageway into a plurality of flow passageways is disposed in the inside of said tubular portion.

10. A mounting apparatus for a condenser according to claim 1, wherein said vertical mounting wall element, said mounting leg element and said tubular element are formed separately from each other from a resin material.

11. A mounting apparatus for a condenser according to claim 10, wherein said vertical mounting wall element is secured in a condition wherein it contacts with an inner peripheral face of said tubular element.

12. A mounting apparatus for a condenser according to claim 10, wherein said vertical mounting wall element is secured in a condition wherein it contacts with an inner peripheral face of said mounting leg element.

13. A mounting apparatus for a condenser according to claim 10, wherein said vertical mounting wall element is secured in a condition wherein it contacts with an outer peripheral face of said tubular element.

14. A mounting apparatus for a condenser according to claim 1, wherein said tubular element is divided into a plurality portions in a circumferential direction.

15. A mounting apparatus for a condenser according to claim 1, wherein said receiving member is an electric fan for sending air to said condenser.

16. A mounting apparatus for a condenser according to claim 1, wherein a wind introducing duct is connected to the front of said tubular element for preventing air having passed said condenser from coming around to the front of said condenser.

17. A mounting apparatus for a condenser according to claim 16, wherein said tubular element has an arresting portion such as a snap pin, a rail portion or a hub portion adjacent said wind introducing duct, and said wind introducing duct has, adjacent said tubular element, a cooperating portion for cooperating with said arresting portion of said tubular element.

18. A mounting apparatus for a condenser according to claim 1, wherein said tubular element is a rectangular tubular frame member, and said mounting leg element is provided on a side portion of each of the left and right side portions of said rectangular tubular frame member.

* * * * *